United States Patent
Von Bokern et al.

(10) Patent No.: US 9,015,793 B2
(45) Date of Patent: Apr. 21, 2015

(54) HARDWARE MANAGEMENT INTERFACE

(71) Applicant: McAfee, Inc., Santa Clara, CA (US)

(72) Inventors: Vincent Edward Von Bokern, Rescue, CA (US); Purushottam Goel, Portland, OR (US); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 150 days.

(21) Appl. No.: 13/725,722

(22) Filed: Dec. 21, 2012

(65) Prior Publication Data
US 2014/0181891 A1    Jun. 26, 2014

(51) Int. Cl.
H04L 29/06    (2006.01)

(52) U.S. Cl.
CPC ............ H04L 63/20 (2013.01); H04L 63/0876 (2013.01); H04L 63/102 (2013.01)

(58) Field of Classification Search
CPC ............................... H04L 29/06; H04L 63/20
USPC .......................................................... 726/1
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,231,449 B2* | 6/2007 | Ellison et al. | 709/228 |
| 7,506,155 B1 | 3/2009 | Stewart et al. | |
| 8,020,192 B2* | 9/2011 | Wright et al. | 726/1 |
| 8,230,480 B2* | 7/2012 | Fazal et al. | 726/2 |
| 8,341,693 B2* | 12/2012 | Shahbazi | 726/1 |
| 8,412,816 B2* | 4/2013 | Jreij et al. | 709/224 |
| 2006/0053234 A1 | 3/2006 | Kumar et al. | |
| 2007/0240197 A1 | 10/2007 | Blumenthal et al. | |
| 2007/0263236 A1 | 11/2007 | Selvaraj | |
| 2007/0266422 A1 | 11/2007 | Germano et al. | |
| 2008/0005359 A1 | 1/2008 | Khosravi et al. | |
| 2009/0119743 A1 | 5/2009 | Werner et al. | |
| 2009/0307753 A1* | 12/2009 | Dupont et al. | 726/3 |
| 2010/0023782 A1 | 1/2010 | Prakash et al. | |
| 2010/0049988 A1 | 2/2010 | Birman et al. | |

(Continued)

FOREIGN PATENT DOCUMENTS

KR    10-2000-0017956 A    4/2000
KR    10-2004-0088985 A    10/2004

(Continued)

OTHER PUBLICATIONS

International Search Report and Written Opinion in International Application No. PCT/US2013/077340, mailed Apr. 15, 2014, 8 pages.

(Continued)

*Primary Examiner* — Teshome Hailu
*Assistant Examiner* — Thanh Le
(74) *Attorney, Agent, or Firm* — Patent Capital Group

(57) ABSTRACT

A management controller of a computing device is identified on a network and queried for attributes of the computing device. The management controller is securely implemented in hardware of the computing device and is independent of a central processing unit (CPU) of the computing device. Data is received from the management controller that identifies one or more attributes of the computing device. A security policy of the network is implemented for the computing device based on the one or more attributes.

27 Claims, 14 Drawing Sheets

(56) References Cited

U.S. PATENT DOCUMENTS

| | | |
|---|---|---|
| 2012/0084544 A1 | 4/2012 | Farina et al. |
| 2012/0131685 A1 | 5/2012 | Broch et al. |
| 2012/0265988 A1 | 10/2012 | Ehrensvard |
| 2014/0181844 A1 | 6/2014 | Von Bokern et al. |
| 2014/0181894 A1 | 6/2014 | Von Bokern et al. |

FOREIGN PATENT DOCUMENTS

| | | |
|---|---|---|
| KR | 10-2006-0067035 A | 6/2006 |
| KR | 10-0966236 B1 | 6/2010 |
| WO | WO 2014/099196 A1 | 6/2014 |
| WO | WO 2014/099690 A1 | 6/2014 |
| WO | WO 2014/100781 A1 | 6/2014 |

OTHER PUBLICATIONS

International Search Report and Written Opinion in International Application No. PCT/US2013/075227, mailed Apr. 22, 2014, 9 pages.

International Search Report and Written Opinion in International Application No. PCT/US2013/070459, mailed Feb. 28, 2014, 10 pages.

* cited by examiner

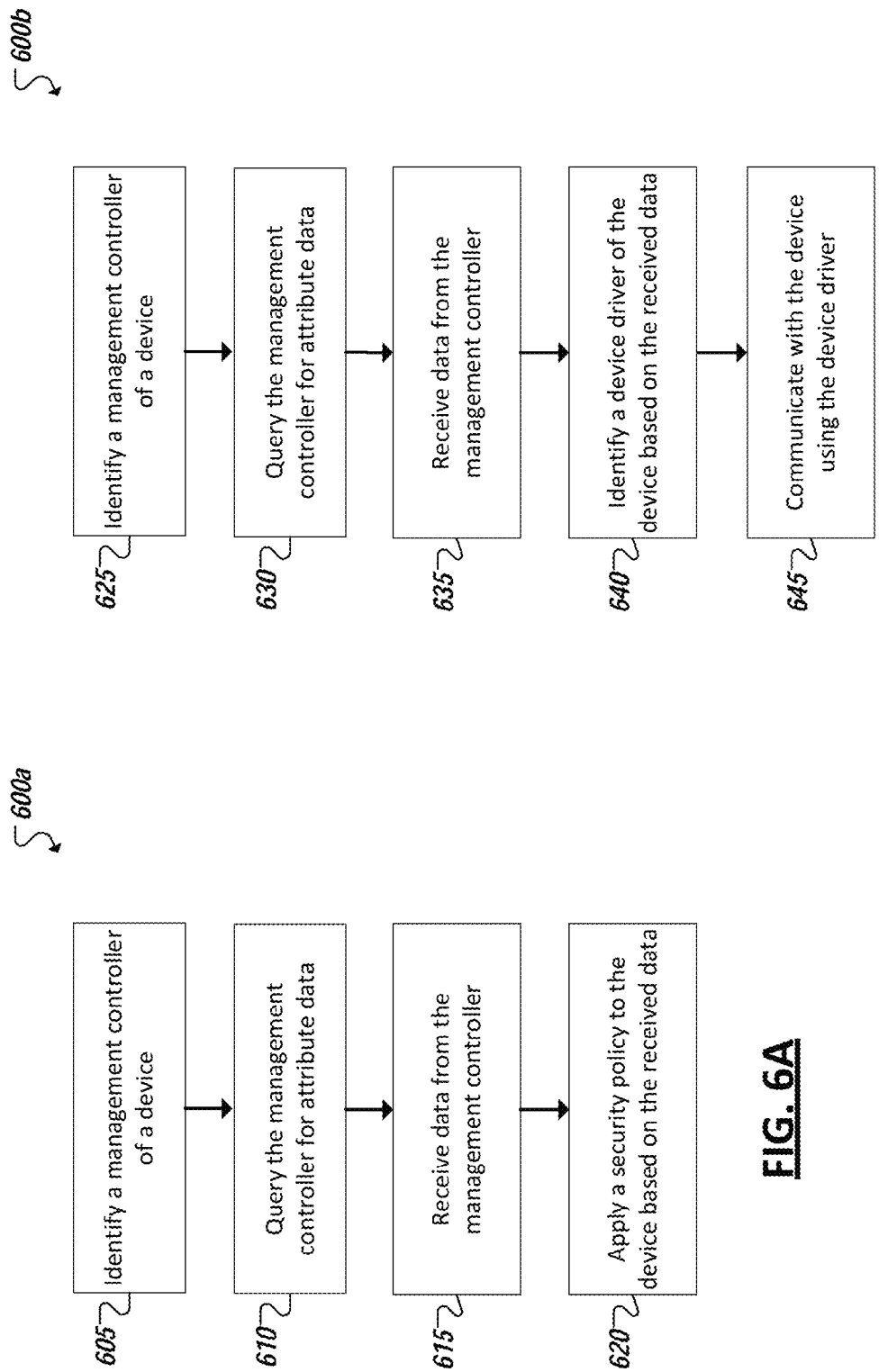

US 9,015,793 B2

HARDWARE MANAGEMENT INTERFACE

TECHNICAL FIELD

This disclosure relates in general to the field of computer management and, more particularly, to hardware-based computer management.

BACKGROUND

Computer systems management within modern enterprises and networks can include the use of tools and techniques and tools for discovering attributes of the respective sub-systems in the network. Security tasks and management can be performed, for example, by assigning and enforcing security policies against devices in the network. Policies can be assigned to particular devices based on known attributes of the devices, for instance. Further, gaining access to and/or communicating with various devices in a network can include software-based tools configured to enable communication of various data between different operating systems and devices. Further, software-based agents can be installed on various devices within a system to provide administrators with the ability to inspect, control, and perform tasks on the devices, including security-related tasks. Traditionally, software-based agents are installed through the operating system of the host device, and the operating system is booted when the agent is active and able to communicate with management services utilizing and performing tasks through the agent. In such instances, management of the host device can be considered dependent on the presence (and operability) of the host device's operating system and/or the presence and operability (and security) of the installed agent.

BRIEF DESCRIPTION OF THE DRAWINGS

FIGS. 6A-6B are simplified flowcharts illustrating example techniques for managing one or more system devices having hardware-based management controllers in accordance with at least one embodiment.

Like reference numbers and designations in the various drawings indicate like elements.

DETAILED DESCRIPTION OF EXAMPLE EMBODIMENTS

Figure 1:
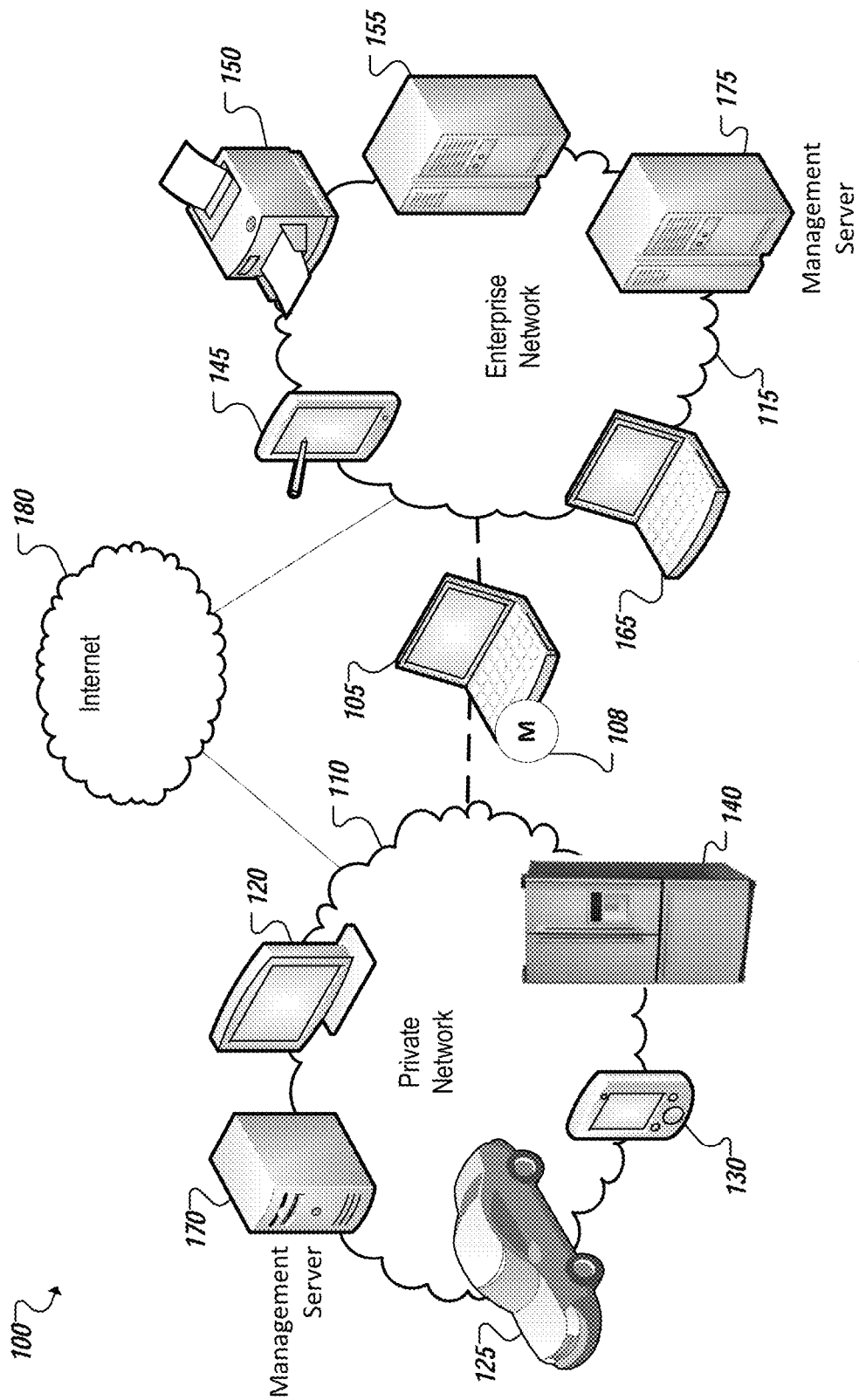
FIG. 1 is a simplified schematic diagram of an example computing system including a system device having a hardware-based management controller in accordance with at least one embodiment.

FIG. 1 is a simplified block diagram illustrating an example computing system 100 including a system device 105 having a computing processor and a hardware-based management controller allowing management systems and services to communicate with the system device 105 out-of-band and independent of the system device's 105 operating system. Further, system device 105 can include capabilities for communicating over channels of one or more communication networks 110, 115. In one example, some networks can include personal networks of private or personal computing devices, such as in private network 110, including a diverse array of system devices that include computer processing devices, such as a smart television 120, in-vehicle computers 125, a smartphone 130, smart appliances (e.g., 140), as well as other computing devices and other at least partially computer-controlled or -assisted appliances and devices. The system device 105, in some instances, can join the private network 110 including system devices 120, 125, 130, 140, for instance, when the system device 105 is located at a home or other location where the private network is located (e.g., an access point of a private local area network) or accessible. In other instances, such as when the user of system device 105 is at work, in a university, or another environment with a network controlled by another organization, the system device 105 can be included in that network, such as an enterprise network 115. This second network 115 can also include a plurality of various system devices, including other personal computing devices (e.g., 145, 165), computing peripherals (e.g., printer 150), enterprise servers (e.g., 155), among other potential system devices.

Each of networks 110, 115, or domains, can include a respective management system 170, 175, each management system 170, 175 including functionality for identifying a hardware-based management controller of system devices interfacing with the network. A management system 170, 175 can additionally interface and communicate with the management controller of system devices (e.g., 105) to perform device management tasks for or on the system device 105 utilizing the management controller 108. A management controller (e.g., 108) can be present on the motherboard or chipset of the system device 105 and be embodied on a microcontroller or dedicated processor independent of the central processing unit (CPU) (and any operating system) of the system device 105 in some implementations. A management system 170, 175 can thereby access at least some data and controls of the system device 105 through the management controller 108 and perform tasks and scans of the system device 105 through a trusted, hardware-based controller 108.

In some instances, a management system 170, 175 can provide an application programming interface (API) adapted to allow the management controller of the system device 105 to interface with and receive and respond to instructions and requests of the management server 170, 175. For instance, a management system can provide system-security-related APIs, with the management server 170, 175 performing security-related tasks for a network 110, 115 through a management controller of the system device. Further, a management controller (e.g., 108) of a system device can expose an API into the system device to a management system (e.g., 170, 175). Such APIs make use of hardware-based communication channels between the hardware-based management controller of a system device and the management system of the corresponding domain. Such communication channels can be secured communication channels, secured via encryption, for instance. Additionally, an API can be based on authentication of the management controller with the management system and/or the management system with the management controller. In some implementations, authentication of the management controller can be based on a secure identifier of the system device derived out of private data of the hardware-based management controller. For instance, secure identifiers can be utilized according to principles described in U.S. patent application Ser. No. 13/726,140, now issued as U.S. Pat. No. 8,850,543, entitled "Hardware-Based Device Authentication," U.S. patent application Ser. No. 13/726,148, entitled "Hardware-Based Device Authentication," and/or U.S. patent application Ser. No. 13/726,167, entitled "Trusted Container," which are each respectively incorporated by reference herein in their entirety.

In general, "servers," "clients," "computing devices," "network elements," "hosts," "system-type system entities," and "systems," including system devices in example computing environment 100 (e.g., 105, 120, 125, 130, 140, 145, 150, 155, 165, 170, 175, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 140, 145, 150, 155, 165, 170, 175, etc.) can each include one or more processors, computer-readable memory, and one or more interfaces, among other features and hardware. Servers can include any suitable software component or module, or computing device(s) capable of hosting and/or serving software applications and services (e.g., management systems 170, 175, services and applications of server 155, etc.), including distributed, enterprise, or cloud-based software applications, data, and services. For instance, in some implementations, a management system server 170, 175 or other sub-system of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 105, 130, 145, 165, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 110, 115). Computer-assisted, or "smart," appliances can include household and industrial devices and machines that include computer processors and are controlled, monitored, assisted, supplemented, or otherwise enhance the functionality of the devices by the computer processor, other hardware, and/or one or more software programs executed by the computer processor. Computer-assisted appliances can include a wide-variety of computer-assisted machines and products including refrigerators, washing machines, automobiles, HVAC systems, industrial machinery, ovens, security systems, and so on.

Attributes of user computing devices, computer-assisted appliances, servers, and computing devices generally (e.g., 105, 120, 125, 130, 140, 145, 150, 155, 165, 170, 175, etc.), can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some system devices can further include at least one graphical display device and user interfaces, supported by computer processors of the system devices, that allow a user to view and interact with graphical user interfaces of applications and other programs provided in system 100, including user interfaces and graphical representations of programs interacting with applications hosted within the system devices as well as graphical user interfaces associated with management systems 170, 175, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Detecting, identifying, tracking, and managing assets in computing systems has traditionally been a significant challenge facing system administrators, particularly as it relates to security of the system. A single unknown, poorly understood, or poorly monitored device connected to a network can potentially expose the entire system to a variety of security threats and vulnerabilities, including malware, unauthorized data access, rogue users, etc. In some instances, agents can be installed on system devices to assist administrators in obtaining a view of the attributes of the system device, easily detect and communicate with the device on the network, and enforce particular security policies on the system device. Unmanaged devices (i.e., devices that do not possess an installed agent), however, may remain outside the communication, control, and monitoring of management systems designed to enable inter-device communication and operation, detect devices as they enter and leave the network, apply policies to various devices, and enforce security on the network. Indeed, installing agents on some devices can be difficult, with the provisioning of agents jeopardized by the very dearth of information concerning the unmanaged device. Further, unmanaged devices, in some instances, rather than being able to integrate into a network and be a benefit to the user or the network at large, may be sent to a quarantined or managed sub-network until the unmanaged device can be more carefully inspected by administrators, have an agent installed, better understood, etc. Additionally, the universe of potentially unmanaged devices continues to increase as more and more devices become "smart," in that they are increasingly controlled by computing processors, include network communication adapters, and are able to communicate with other systems.

Figure 2:
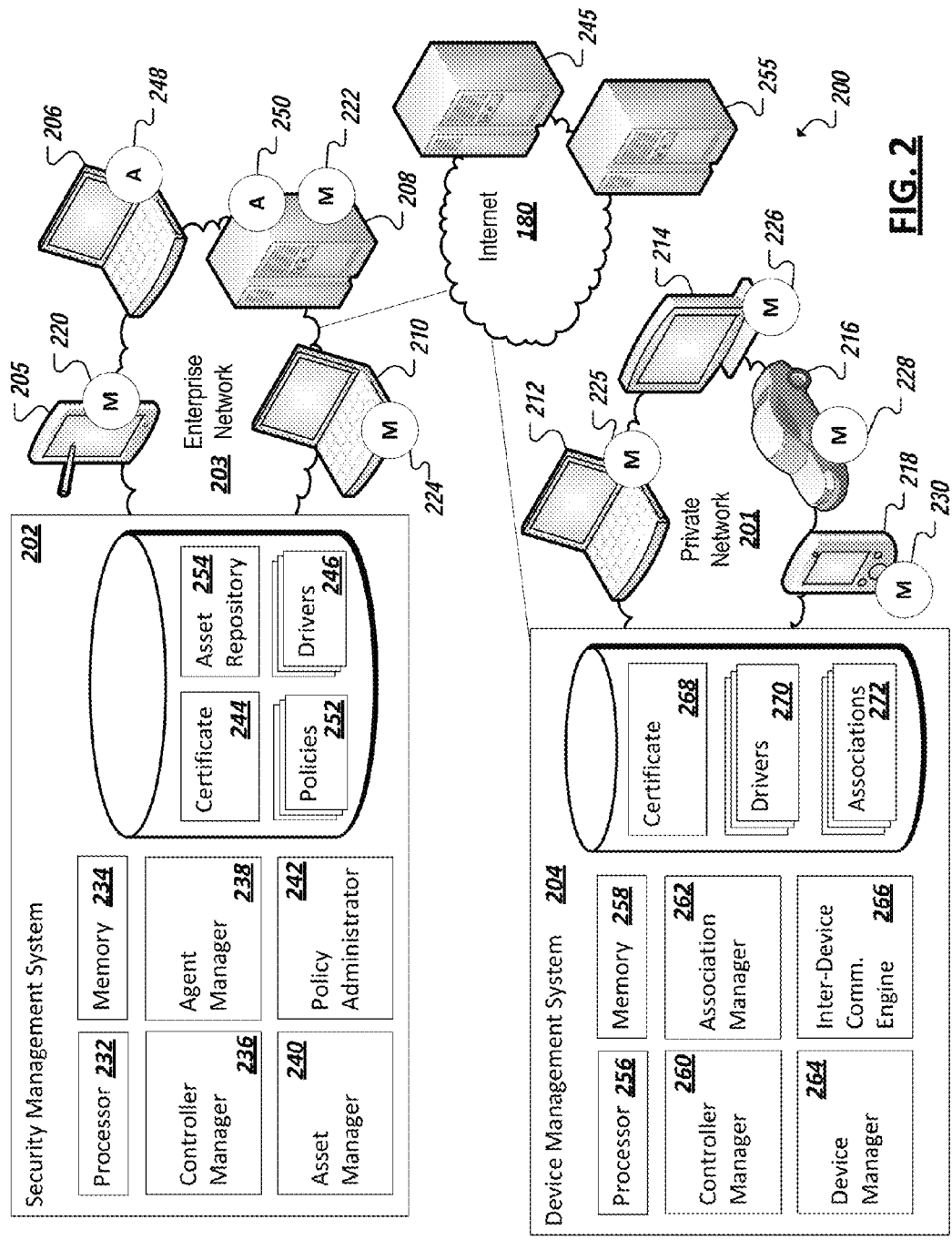
FIG. 2 is a simplified block diagram of an example computing system including example management systems adapted to interface with and use hardware-based management controllers on one or more system devices within the system in accordance with at least one embodiment.

At least some of the systems described in the present disclosure, such as the systems of FIGS. 1 and 2, can include functionality that, in some cases, overcomes the above-discussed deficiencies, as well as others not explicitly described herein. For instance, management systems can be equipped with functionality for interfacing with hardware-based management controllers on chipsets of system devices joining or already on a network or domain managed by the management system. The system devices' management controller hardware interfaces can be leveraged by management systems to authenticate and/or pair the management controller to the management system, allow inspection by the management system of critical system elements of the system device, establish secure communication between the management system and system device, enable security provisioning on the system device, attest state of the system device, and perform metrics and monitoring of the system device, among other functions. Further, by communicating with the system device through the management controller of the system device, a management system can speak directly to the device out-of-band or through channels otherwise outside the view, influence, access, or control of the operating system of the system device (and/or system device CPU), and independent of the presence of an agent on the system device.

Turning to the example of FIG. 2, a simplified block diagram 200 is shown illustrating an example system including management systems 202, 204 managing networks 201, 203 including respective system devices 205, 206, 208, 210, 212, 214, 216, 218 some of which having management controllers (e.g., 220, 222, 224, 225, 226, 228, 230) that can be leveraged by management systems 202, 204 in their management of networks (e.g., 110, 115) and environments including the system devices (e.g., 205, 208, 210, 212, 214, 216, 218, etc.).

In some implementations, a variety of different management systems 202, 204 can be provided that are able to interface and communicate with hardware-implemented management controllers (e.g., 220, 222, 224, 225, 226, 228, 230, etc.) of a variety of different system devices. In some instances, management controllers can be embodied on a variety of different system devices and chipsets, including chipsets of various manufacturers. Such chipsets can include system motherboards, application specific integrated circuits (ASIC), field-programmable gate arrays (FPGA), and in connection with other chipsets, microprocessors, and microcontrollers. In some instances, management controllers 220, 222, 224, 225, 226, 228, 230 can be implemented according to a particular standard or interface, allowing any management system adapted to interface with the defined management controller standard to be compatible with and interface with system entities using the management controllers.

Figure 3:
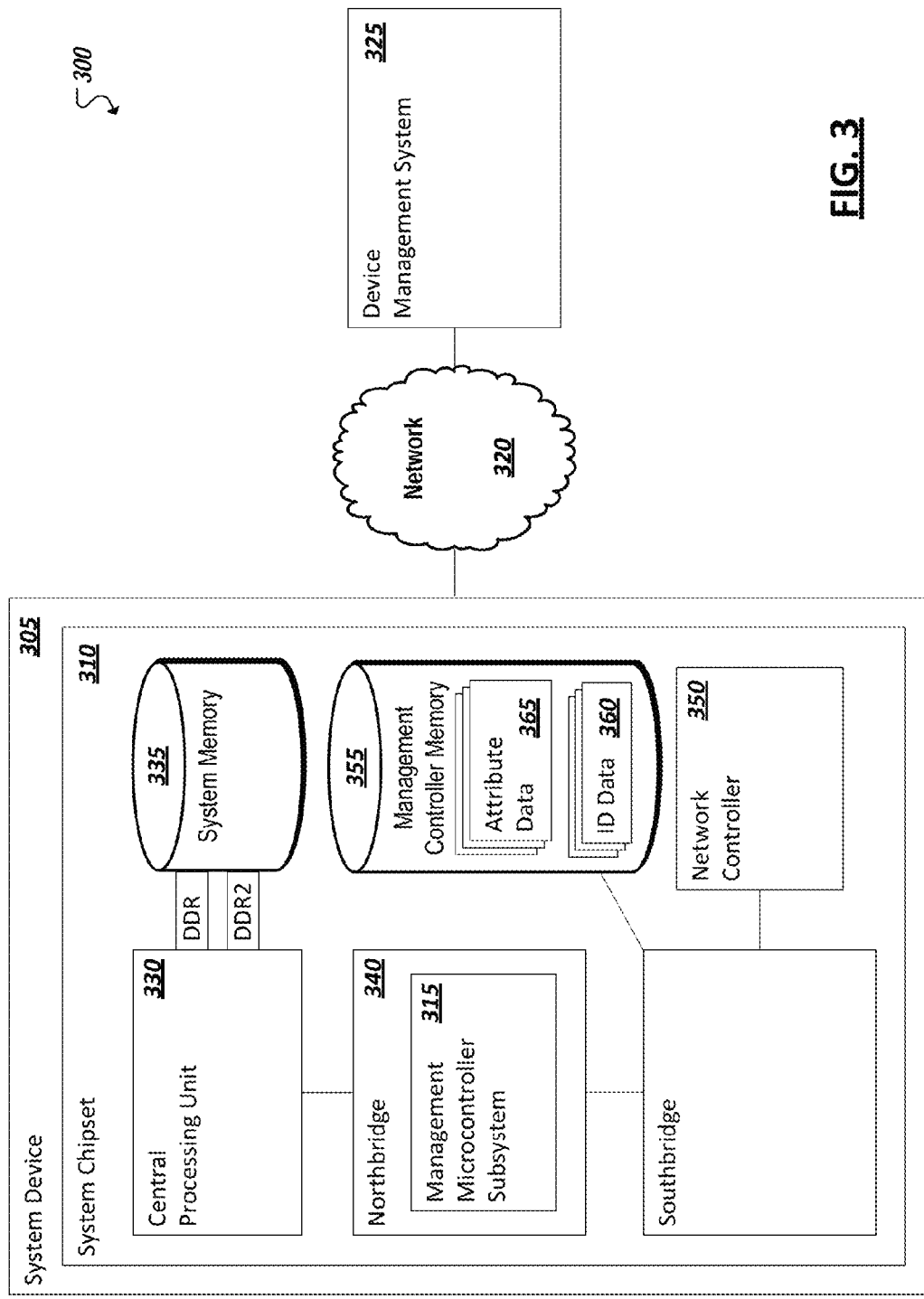
FIG. 3 is a simplified block diagram of an example system device chipset including an example hardware-based management controller in accordance with at least one embodiment.

Turning to FIG. 3, a simplified block diagram 300 is shown of an example system device chipset 310 of an example system device 305 including an example hardware-based management controller (e.g., 315). As noted above, a system device 305 can include at least some computing processing hardware (e.g., 310) utilized to at least partially automate, provide computer-assisted control, monitoring, or other computer-assisted functions in connection with the system device 305. In this particular example, a system chipset 310 can provide, at least in part, the computer-assisted functions of a system device 305, including allowing the system device to connect to and communicate with one or more networks (e.g., 320) through chipset 310. A system chipset 310, in one particular example, can include a central processing unit 330 utilizing system memory 335 to execute an operating system and one or more software programs in system memory 335. The system chipset 310 can further include management microcontroller subsystem 315, embodying a hardware-implemented management controller, separate from the central processing unit (CPU) 330. In the particular example of FIG. 3, management microcontroller 315 can be implemented, for instance, as an embedded microcontroller (e.g., on a northbridge chip 340 of chipset 310, as a dedicated management controller chip, etc.) on hardware of system chipset 310.

An example management microcontroller 315, in some implementations, can run a lightweight microkernel operating system that provides a low-power, out-of-band management controller. Management microcontrollers can be functionally segregated from the CPU and its operations in a restricted, trusted, and secure environment. In some implementations, management microcontroller 315 can utilize memory 355 separate from system memory 335, such as a flash memory component of the management microcontroller, from which the management controller instruction code can be loaded. Additionally, secure memory 355 can also be used to store authentication data, secure identifiers of the system device 305, and attribute information data of the system device 305 (and/or chipset 310) that can be accessed and used by the management controller. Such implementations can permit management microcontroller 315 to be running and operational when the CPU 330, operating system, and/or other hardware and software components of system device 305 are powered-down, sleeping, hibernating, not loaded into system memory 335, or otherwise not available. Indeed, in some implementations, power states of the management microcontroller 315 can be independent of power states of other hardware, including the CPU 330, of the chipset 310.

Management microcontroller 315 can further be configured to access networks while the operating system of the system device 305 is unavailable. Accordingly, management microcontroller 315 can have direct access to network interfaces of the system device. In some implementations, management microcontroller can run a fully independent, out-of-band communication channel (such as through a dedicated TCP/IP stack) allowing the microcontroller to inspect and receive packets not processed by the CPU, as well as inspect inbound and/or outbound traffic before the CPU has access to it. Effectively, two logical network connections can be maintained on a single physical networking connector (e.g., at 350), one in-band through the CPU 330 and the other out-of-band through the management microcontroller 315. Network filters in network controller(s) 350 can be utilized to programmatically redirect traffic to either a host operating system interface or the interface of the management controller at micromanagement controller 315, for instance, based on port numbers. An independent network communication channel can allow the management microcontroller 315 (and management controller implemented using the management microcontroller) to perform a variety of communications and remote management functions that can take place effectively at all times without regard to the state of the operating system, for example.

Management microcontroller 315 can utilize its independent and/or dedicated network communication channel(s) to communicate with outside systems, including management system 325 over network 320. Identification data 360 can be maintained on management controller-accessible memory (e.g., 355) and can be exchanged or used to derive secure identifiers exchanged with a management system (e.g., 325) to authenticate the management controller to the management system 325 as well as (or alternatively) to authenticate the management system 325 to the management controller (e.g., through a comparison of a certificate received from the management system 325 with a certificate maintained in identification data 360, among other examples). Attribute data 365 can also be maintained in management controller-accessible memory (e.g., 355). Such attribute data 365 can be communicated to an authenticated management system (e.g., 325) in a secure session between the management controller and management system. The management controller can expose the attribute data to a management system 325, for instance, via an API provided between the management system and management controller providing a communication interface for messaging between the management microcontroller 315 and the management system 325.

Management controller-accessible memory (e.g., 355) can also be written-to by the management microcontroller. In some implementations, management controller-accessible memory (e.g., 355) can be non-volatile, protected memory, in that other hardware components of system device 305 and the operating system of the system device 305 cannot access the memory, thereby ensuring the integrity and confidentiality of information stored on the memory 355. In some implementations, modifications to management controller-accessible memory (e.g., 355) resources (e.g., 360, 365) can be limited to delete requests of identification data 360, thereby allowing a user to clear identification data (e.g., prior to selling or recycling the system device or in an effort to preserve the user's privacy). Further, in addition to protected management controller-accessible memory (e.g., 355), management microcontroller 315 can, in some implementations, additionally access system memory 335 itself, allowing additional information concerning system device 305 to be accessed and exposed through interfaces of the management controller. For instance, the management microcontroller 315 can be used to inspect other components of the system device 305 to identify and collect attribute information of the system device, including attributes discoverable in system memory (e.g., applications on the system device, historical activity on the system device, device status, network connections, user profiles of the system device, etc.). In other implementations, management microcontroller 315 can be provided with functionality and interfaces allowing the management microcontroller 315 to write to or otherwise access system memory 335, and perform such tasks as loading agents, other programs and data onto the system device, among other examples.

Returning to the examples of FIG. 2, in some example implementations of a management system 202, the management system 202 can be tailored to provide security management and other services for a domain, such as an enterprise network (e.g., 203). For instance, security management system 202 can include a processor 232 and memory elements 234, as well as one or more hardware and software components including a controller manager 236, agent manager 238, asset manager 240, and policy administrator engine 247, among other potential components.

In some implementations, a controller manager 236 can include functionality for interfacing with hardware-implemented manager controllers (e.g., 220, 224) on system devices (e.g., 205, 210) in the domain 203. For instance, a controller manager 236 can be used to interface with a management controller 224 of laptop computer 210, out-of-band, to pair to the management controller 224. This can include mutual authentication between the management controller (e.g., 224) and management system 202. In some implementations, certificates, secured identifiers, and other authentication data (e.g., 244) can be exchanged between the management system 202 and management controller (e.g., 224). In some instances, certificates or other authentication data used in the pairing of management system 202 and the management controller can be specific to the pairing (i.e., in that the management controller uses and expects different authentication data in communications and transactions with other management systems (e.g., 204), thereby serving to assist in the preservation of privacy and security of the system device (e.g., 210) accessible, at least in part, through a management controller (e.g., 224)). For instance, mutual authentication of a management system and management controller can be accomplished according to principles described in U.S. patent application Ser. No. 13/726,140, now issued as U.S. Pat. No. 8,850,543, entitled "Hardware-Based Device Authentication" and/or U.S. patent application Ser. No. 13/726,148, entitled "Hardware-Based Device Authentication" incorporated by reference herein. By authenticating the management controller to the management system 202 (and vice versa, in some instances), the management system 202 and management controller can pair and a secure communication channel or API can be established between them, allowing the management system 202 to query and request data of the management controller, receive data from the management controller, and send instructions to the management controller, among other examples.

A controller manager 236 can further interface with a management controller to obtain attribute information of at least a portion of the computing functionality of a system device, such as through management controller 224 of laptop computer 210. Such attribute information can include data stored in memory accessible to the management controller 224 (e.g., separate from system memory) that identifies the make, model, and/or manufacturer of the computing device, as well as, for instance, the software (e.g., operating system) of the laptop computer, its version, etc. Attribute information can be used by the management system 202 to better understand and manager the corresponding system device. For examples, controller manager 236 can identify one or more device drivers (e.g., 246), based on the attribute information, that can be used by the management system 202 to communicate with the laptop computer 210, including in-band, through the central processor and operating system of the laptop computer 210. Further, attribute information can include information usable by the management system 202 in assessing security of the corresponding system device (e.g., 210). In one example, attribute information can include one or more device identifiers (IDs) of the system device, security provisioning status of the device (e.g., whether the device have an agent installed or otherwise operable on the device), security history of the device since the last interrogation of the management controller by the management system 202, the network gateways the system device has connected to over a particular time period, the network status of the device (e.g., whether it is on/off, currently live on a network, etc.), among other information and data the management controller can access or identify, including when the system device is hibernating or powered off or has an inoperable operating system, etc.

Pairing to a management controller, as noted above, can permit the management system 202 to communicate with and receive data from the management controller. Device controller manager 236 can utilize information obtained from the management controller (e.g., 224) to trigger additional actions by the management system 202 relating to the security of the domain managed by the management system 202. For example, management system 202 can operate cooperatively with or manage a set of security tools, deployed locally on the target system device and/or remote from the system device within the domain, such as, for instance, firewalls, web gateways, mail gateways, host intrusion protection (HIP) tools, network intrusion protection (NIP) tools, anti-malware tools, data loss prevention (DLP) tools, system vulnerability managers, system policy compliance managers, asset criticality tools, intrusion detection systems (IDS), intrusion protection systems (IPS), and/or a security information management (SIM) tools, among other examples. Security policies can be defined governing how and what operations are to be employed by the security tools on the system devices. Nonetheless, security enforcement is also possible locally on a target system device, for instance, through security tools running, loaded, or otherwise interfacing directly with the system device and providing management system 205, in some instances, with an interface for enforcing policy directly at the target device. For instance, in some examples, agents (e.g., 248, 250) on the system devices can serve as a security enforcement tool, for instance, blocking particular activities locally at the device according to one or more security policies applied to the particular system device, passing policy instructions to other security tools on the particular system device, among other examples. Security policies can be applied to system devices based on the attributes of the system devices. Such attributes, as noted above, can be identified and collected using agents installed on the devices and/or a hardware-based management controller of the system device, among other examples.

In some instances, management system 202 can determine whether and what type(s) of agents are installed on the system device (e.g., 210) of the management controller (e.g., 224), as well as determine whether (and what type) of agent could be installed on the corresponding system device (e.g., 212) to provide the management system 202 with even more tools for scanning, communicating with, and enforcing security on the system device (e.g., outside of the management controller). Indeed, in some examples, controller manager 236 can provision a system device 210, using management controller, with an agent. In other examples, attribute information and/or device drivers (e.g., 246) obtained or identified for the system device (based on information obtained from the management controller (e.g., 224)) can be used to install an agent on the system device, for instance, through the operating system of the system device. In some cases, an agent provisioned on a system device (e.g., 210) can be a dissolvable or otherwise temporary agent, such as an agent that is temporarily provisioned while the system device (e.g., 210) is on the managed network (e.g., 203) and is torn-down when the system device leaves the network 215.

As shown in the example of FIG. 2, an example management system 202 can further include an agent manager 238 adapted to interface with agents of system devices on network 215. Agents (e.g., 248, 250), including agents provisioned on system devices based on and/or through a management controller of the respective system device, can include software-based agents that permit management system 202 to inspect particular attributes, configurations, and activity of the corresponding system device. Such agents can make the detection of corresponding devices on the network, monitoring of particular important device attributes, and enforcement of particular security policies at the system device quite simple. In some instances, a management system 202 can supplement the interface provided through a software-based agent (e.g., 250) to its host (e.g., 208) with interfaces provided through a hardware-based management controller (e.g., 222) also on the system device, to obtain pertinent security information and perform particular security tasks on the system device. Indeed, a management controller can provide a form of failsafe against failure of a system device's operating system and thereby also any agents on the system device, providing the management system with another view into the workings of the system device.

An example management system 202 can further include an asset manager 240. A management system 202 can catalogue the system devices detected as on or otherwise using the network 215, together with known attributes of each respective system device. Such information relating to the set of system devices detected on the network 215 can be recorded within an asset repository 254 (or other database, data structure(s), etc.). Such an asset repository 254 can be built, supplemented, and otherwise managed, for instance, by asset manager 240. Further, the management system 202 can utilize an asset repository 254 to track the system devices within the network and automatically apply particular policies 252 to particular, detected system devices (e.g., 205, 206, 208, 210) based on attributes of the system devices catalogued in the asset repository 254. Further, attribute information of the various system devices obtained from interrogations of and communications with corresponding management controllers (e.g., 220, 222, 224) of the system devices can be stored and used in asset repository 254 informing how policies 252 are applied to and enforced against system devices in the network 215.

In some implementations, a policy administrator engine 242 can provide the functionality for assigning policies 252 to particular system devices and enforcing the policies. Further, in some implementations, policy administrator engine 242 can further include functionality for defining new policies, modifying existing policies, establishing rules and criteria for applying policies to particular system devices (e.g., based on detected attributes of the devices), and so on. A policy administrator engine 242 can operate in cooperation with one or more various security tools deployed within the network and locally on the system devices themselves. For instance, some security tools can be deployed remote from a system device allowing for policy enforcement to take place remote from and behalf of the target system device, application, or person, thereby allowing security enforcement without the policy (or enforcement) being pushed to the target itself. This can be useful, for instance, in the security enforcement of mobile devices that move on and off of a monitored network, as well as unmanaged devices, such as devices not including agents or other local security tools capable enforcing important security policies.

Other management systems (e.g., 204) of other domains (e.g., private network 201) can include functionality focused on assisting management and interoperability of different devices within a computing environment. For instance, device management system 204 can include a processor 256 and memory elements 258 and one or more components embodying functionality of the management system 204, including, for example, a controller manager 260, association manager 262, reference engine 264, inter-device communication engine 266, and so on. A controller manager 260 of management system 204 can be adapted to interface with management controllers on network 201. The controller manager 260 of management system 204 can possess functionality similar to that in the above-described controller manager 236 of management system 202. This can be particularly so, for instance, when each of different management systems 202, 204 are adapted to each interface with and communicate with a common type or standard of controller managers included on various system devices in the respective networks 203, 201. For instance, controller manager 260 can include functionality for detecting a system device (through its controller manager) and identifying whether the system device is on the network 201. Further, controller manager 260 can be used to authenticate and pair to management controllers (e.g., 225, 226, 228, 230, etc.) and establish a communication protocol and secure communication channels for messaging between the respective management controller and controller manager 260.

Further, attribute information stored at the system device and accessible to a manager controller can be communicated to an authenticated management system 204 using a controller manager 260 of the management system 204. Such information can include information identifying the type of system device and computing equipment on the system device, allowing the management system to either identify and/or retrieve device drivers corresponding to the system device. Such information can further include a secure identifier of the system device derived in hardware of the device.

As an illustrative example, attribute information can be sent to management system 204 using a management controller 226 of a particular smart television device 214 on a private network 201, such as a home network. The attribute information, in this particular example, can include the identification of the make, model, and manufacturer of the system device's computing equipment and/or the system device itself. The attribute information can also include identification of firmware, operating systems, and other software used by the system device's computing equipment, including version information. Using the attribute information, management system (e.g., using controller manager) can identify source (e.g., 245) serving device drivers for the system device and/or its computing equipment. For instance, in one illustrative example, controller manager 260 can interface with a management controller 228 of an in-dash computing system of a car 216 and obtain information such as the car's make, model, and manufacturer as well as, in some cases, the make, model, manufacturer, and software version of the in-dash computing system. A controller manager 260 can similarly interface with management controllers (e.g., 225) of more traditional computing devices, such as a personal laptop computer 212, among other examples. In either case, the controller manager 260 can use information obtained from the management controller to query sources over the internet 180, for instance, to identify device drivers for download onto the management system 204 for use by the management system 204 in communicating with the system device (e.g., 216) as well as exposing available functions, interoperability, and features of the system device (e.g., 216).

In addition to using attribute information of the system device obtained from the management controller of the system device to identify and obtain device drivers for the system device, attribute information can be further used by the management system to identify additional information regarding the system device from third-party sources. For example, continuing with the example of an in-vehicle computer in automobile 216, the make, model, and manufacturer of the automobile 216 (and/or the in-vehicle computer) can be determined through out-of-band communications with controller manager 260 and used by management system 204 to identify a source server (e.g., 255) hosting additional information about the automobile. For instance, source server 255 can include a server associated with the manufacturer of the automobile, a vehicle history database, automobile maintenance providers associated with the automobile, etc. Through communication with source server, management system 204 can share at least a portion of the information obtained from management controller 228 with the source server, such as the make and model of the automobile, vehicle identification number (VIN) of the automobile, etc. and can obtain additional information from the source server 255 relating to the particular automobile. Such additional information could include recall alerts from the manufacturer, oil change records and status, mileage information, maintenance information, and other information. Information obtained by the management system 204 can be used, for instance, to generate and push alerts and other messages concerning the automobile to a user (e.g., through another system device such as smart phone 218), or tailor other tasks and communications of management system 204 to the particular attributes of the automobile. Appropriate sources and types of supplemental data can similarly be identified and used by the management system 204 based on attribute information obtained from any of the compatible management controllers (e.g., 225, 226, 230) of other devices (e.g., 212, 215, 218) in the domain 201, among other examples.

In some examples, a system manager 204 can include functionality for associating two different system devices on a network that otherwise are not adapted to communicate or pair with the other. As noted above, in some examples, management system 204 can identify information relating to one system device in a private network 110 and communicate the information to another system device, for use by the other system device. Associations (e.g., 272) can be generated, for instance, using association manager 262 of management system 204 identifying or defining a relationship between two or more system devices 212, 214, 216, 218 in a private network 110. Such associations can be defined based on a user request to associate two or more of the user's system devices 212, 214, 216, 218 received by the management system from the user via one or more user interfaces of the management system, for example. In other instances, management system can automatically identify, and in some cases, define an association between two or more system devices 212, 214, 216, 218. For instance, management system 204 can identify categories of different system devices that have been identified as having some utility in associating with other categories of system devices. For instance, an interoperation involving a smart household appliance and a smart TV (or other display device) can be defined, allowing, in one example, messages to be communicated to a user of the display concerning the status of an appliance (e.g., laundry is done, no ice cream is in the refrigerator, air conditioner is on, etc.) while the user is observing or otherwise using the display device. A variety of other relationship types and interoperations can be defined and made available to association manager 262 to identify that two different system devices in network 110 are of categories that lend themselves to a pairing according to the pre-defined relationship or interoperation, among other examples.

An association 262 defined by association manager 262 between two different system devices can cause at least one of the associated system devices to be subscribed to messages relating to the other device in the association. Using controller manager 260, information can be obtained from the respective management controller 225, 226, 228, 230 of each system device 212, 214, 216, 218 in network 110 and further information can be obtained by management system 204, using device drivers obtained for the devices (e.g., based on information obtained through management controllers 225, 226, 228, 230). For instance, management system 204 can query each system device in-band or out-of-band (or both) to interrogate a system device for attribute information for use in identifying and establishing relationships between devices. In other instances, system devices can be configured to push alerts, attribute changes, and other information to management system 204. A device manager 264 of management system 204 can manage information, drivers, communication protocols, state, and detection of system devices on the network 110.

Device manager 264 can further be responsible for using information obtained from the system devices, for instance, to query outside sources (e.g., 255) for additional system device information or information providing context for messages received by a system device (e.g., to determine the definition of a particular error code, specification value, or other system device attribute). Where an association, pairing, or subscription between two system devices has been defined, management system 204 (e.g., using inter-device communication engine 266) can identify attribute information regarding a first system device in an association, identify types of information subscribed to or useable by a second system device in the association, identify capabilities of the device from the information, and convert the information to a form usable by the second system device, for instance, in accordance with a device driver obtained for the second system device (e.g., based on an inspection of the second system device through a management controller of the second device). In some instances, messaging between associated system devices can be through a uniform messaging format established by the management system 204 and negotiated between the management system 204 and each system device in the network 201, among other examples.

In some instances, messages communicated to a first system device from a management system 204 based on data obtained from a second system device, can be acted upon by the first system device, resulting in the first device interoperating, through the management system, with the second device. As but one example, an in-dash computer of an automobile can track various attributes of the automobile 216 including whether the vehicle is locked, its fuel level, its oil levels, its temperature, GPS data, and other features and diagnostics. The API of the management system 204 can be provisioned on the management controller 228 of the in-dash computer, drivers 270 of the in-dash computer can be obtained by the management system 204, and a pairing and communication between the management system 204 and in-dash computer of automobile 216 can be established. Management system 204 can thereby query the in-dash computer for particular attribute information of the automobile 216. Further, a similar pairing and communication channel (e.g., through a management system API, drivers, etc.) can be established between management system 204 and smart TV 214. While the in-dash computer of automobile 216 may not support direct communication or interoperability with smart TV 214 (and vice versa) the ability of each of smart TV 214 and in-dash computer of automobile 216 to interface and communicate with management system 204 can permit management system 204 to format and push data from one associated device to another for use by the other device. For instance, on-screen notification display functionality of the smart TV, exposed through a device driver of the smart TV obtained by the management system 204 can be used by the management system 204 to develop messages usable by the smart TV for display as on-screen notifications, including messages developed from attribute information obtained by the management system for automobile 216. In some implementations, the message derived from automobile 216 can be presented as notification on smart TV through communications received through management system 204, allowing a user, while they watch a program on smart TV 214, to see notifications relating to the automobile 216, such as notifications indicating that the GPS location of the automobile 216, whether the automobile 216 has been left unlocked, has windows open, is low on gas, among other attributes. It should be appreciated that this example (of an association between a smart TV and an automobile (i.e., it's internal computing system)) is but one of a potentially limitless variety of examples that could be achieved through a management system leveraging hardware-implemented management controllers of a variety of, in some cases, very different devices, to obtain insights into the functionality and communication protocols and languages of the devices and facilitate some degree of interoperability between them.

In addition to facilitating communication and interoperability between different devices within a private network 201 managed by the management system 204, management system 204 can also facilitate (e.g., using inter-device communication engine 266) interoperability between a system device 212, 214, 216, 218 and an external server device, application, service, or other resource remote external to the network 201, for instance, over the internet 180, or another network. As noted above, data obtained from a system device by a management system 204 (e.g., through a management controller of the system device) can be communicated, at least in part, to an outside source server for use in providing additional information for the device. Such information can also be communicated by the management system 204 in connection with the performance of various services on behalf of the system device at a remote server. Additionally, results returned by the source server can be communicated to the system device over the management system 204, for use by the system device, among other examples.

While the examples of FIG. 2 present two distinct management systems 202, 204 managing two distinct networks 115, 110, it should be appreciated that in some implementations, features described in connection with a consumer-focused, device-management-centric management system (e.g., 204) could be implemented on top of or in addition to enterprise-focused, system-security-centric functionality of management system 202 (and vice versa). Indeed, a variety of different management systems can be developed. Such management systems can include all or a portion of the features described in connection with management system 202, 204 while being adapted to interface with and communicate with management controllers of various system devices to perform particular management tasks. Further, as noted above, a single system device with an embedded management controller can migrate between owners, networks, and domains and, accordingly, migrate between management by and communication with multiple different management systems, such as a home management system and an office management system, among many other examples.

Turning to the examples of FIGS. 4A-4E, simplified block diagrams 400a-e are shown illustrating example operations including an example management system (e.g., 405) interfacing with management controllers (e.g., 465) of system devices (e.g., 460) in a network (e.g., 433). In this particular example, a plurality of managed system devices 415, 420, 425, 430 are provided on a network 433, each system device having one or more respective agents 440, 445, 450, 455 installed on the system device. A security management system 405 can include functionality for detecting the presence of system devices 415, 420, 425, 430 on the network 433, retrieving system device attribute data from the system devices 415, 420, 425, 430, identifying activity of the system devices 415, 420, 425, 430 on the network 433, provisioning system security policies on the system devices 415, 420, 425, 430, and enforcing assigned policies through the respective agents 440, 445, 450, 455 of the system devices 415, 420, 425, 430.

An unknown device 460 can enter the network 433 and be detected by management system 405. In this example, management system 405 can attempt to communicate with a management controller on the unknown device 460 and determine, based on the result of the attempt, whether the unknown device 460 includes a management controller. The management system 405 can also attempt to communicate or otherwise identify an agent on the unknown device. In some implementations, upon identifying that the unknown device 460 includes an agent, the management system 405 can skip the attempt to identify and communicate with a management controller, instead engaging the unknown device 460 through the agent. Further, failure to identify an agent on a device can prompt an attempt to communicate with a hardware-based management controller of the device.

Figure 4A:
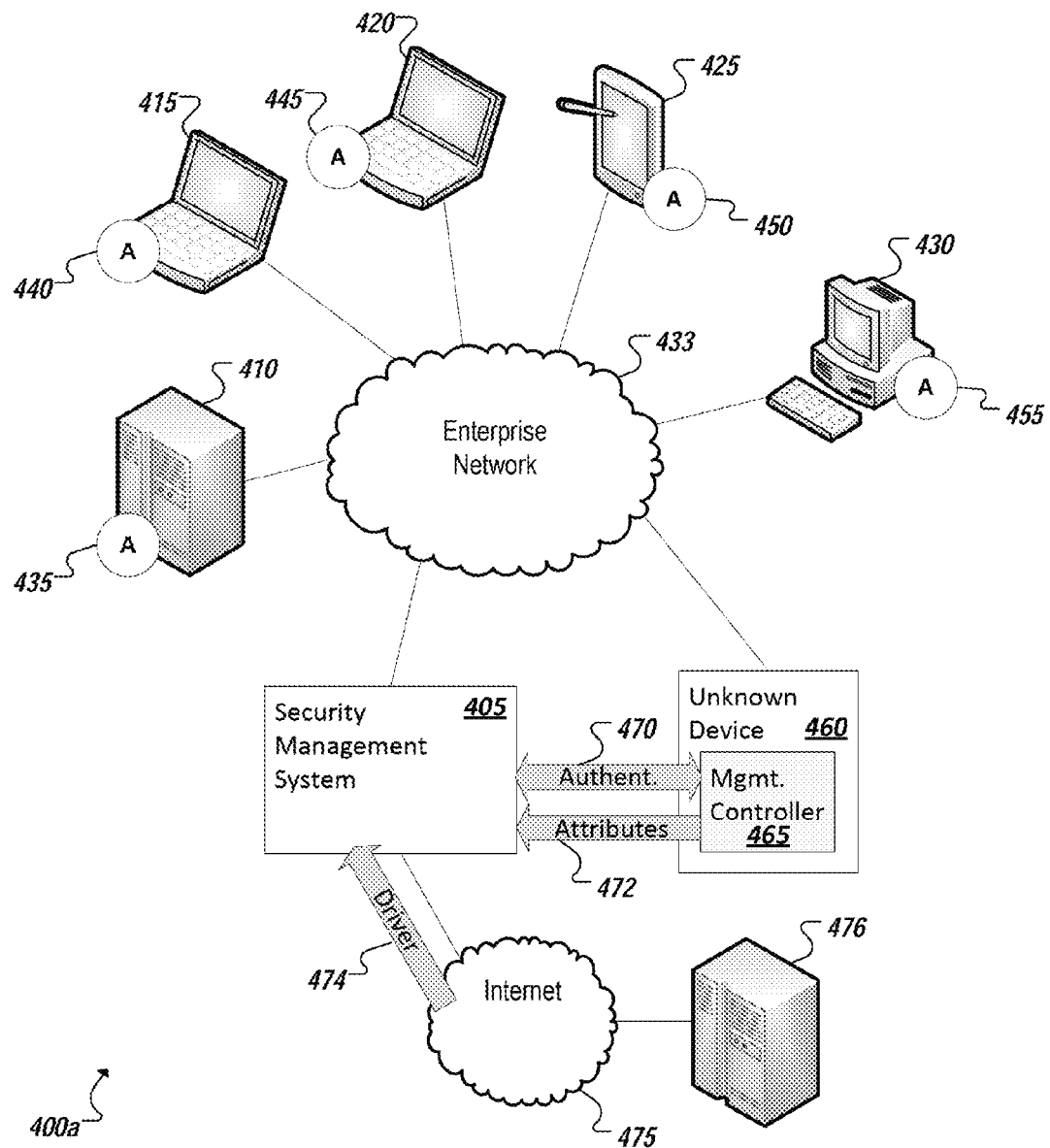
FIGS. 4A-4E are simplified block diagrams illustrating example operations of including an example security management system and one or more system devices having hardware-based management controllers in accordance with at least one embodiment.

In the particular example of FIG. 4A, the unknown device 460 is determined by the management system 405 not to possess an agent and is further identified to have a management controller 465 the management system 405 is adapted to interface with. Accordingly, management system 405 can attempt to authenticate 470 to the management controller 465 of the unknown device 460 and pair to the management controller 465, for instance, based on establishing that the management system is a trusted entity and that the management controller 465, is, in fact, a secure, hardware-based management controller. For instance, the management system can send a certificate to the management controller 465 issued by a mutually trusted certificate authority and the management controller 465 can verify that the management system 405 is a valid holder of the certificate. The pairing of the management system 405 and management controller 465 can further include establishing a secure interface or communication channel (e.g., through an API of the management system) and attribute data 472 accessible through management controller 465 can be exposed or sent to management system 405. Such attribute data 472 can identify a unique device identifier of the unknown device, identify network gateways the devices has connected to in a recent period of time, identify applications and hardware of the device, identify other agents, security tools, countermeasures, etc. deployed on the device 460, among other potential device attributes.

Using attributes obtained from the unknown device 460, the security management system 405 can determine the identity of the unknown device 460 and authenticate (e.g., 470) the device 460. The identity and attributes received from the management controller 465 can be regarded by the management system 405 as being of higher quality, trustworthiness, or security than other data otherwise received from the device 460, in some instances. Further, in some examples, the management system 405 can identify attributes of the device 460 sufficient to identify additional information concerning the device from one or more sources (e.g., 476). Such attributes can include the manufacturer and model of the device, a serial number of the device, services provided through the device, among other examples. In some instances, the management system 405 can identify a remote source 476 associated with the device from the attributes communicated in security posture data 472. The management system 405 can utilize this additional information from source 476 to better inform its interaction with the device as well as enhance services provided to the device (and/or its user). Additionally, in still other examples, a driver of the unknown device can be identified from the attribute information, such as by querying an identified source 476. The management system 405 can identify that it already possesses the driver of the unknown device 460 as well as download the driver from the source 476 (or another source), for instance, over a wide area network such as the internet 475. The management system 405 can utilize the driver to better communicate with and perform actions involving the unknown device, as well as coordinate operation of the device 460 within the enterprise network domain 433.

Figure 4B:
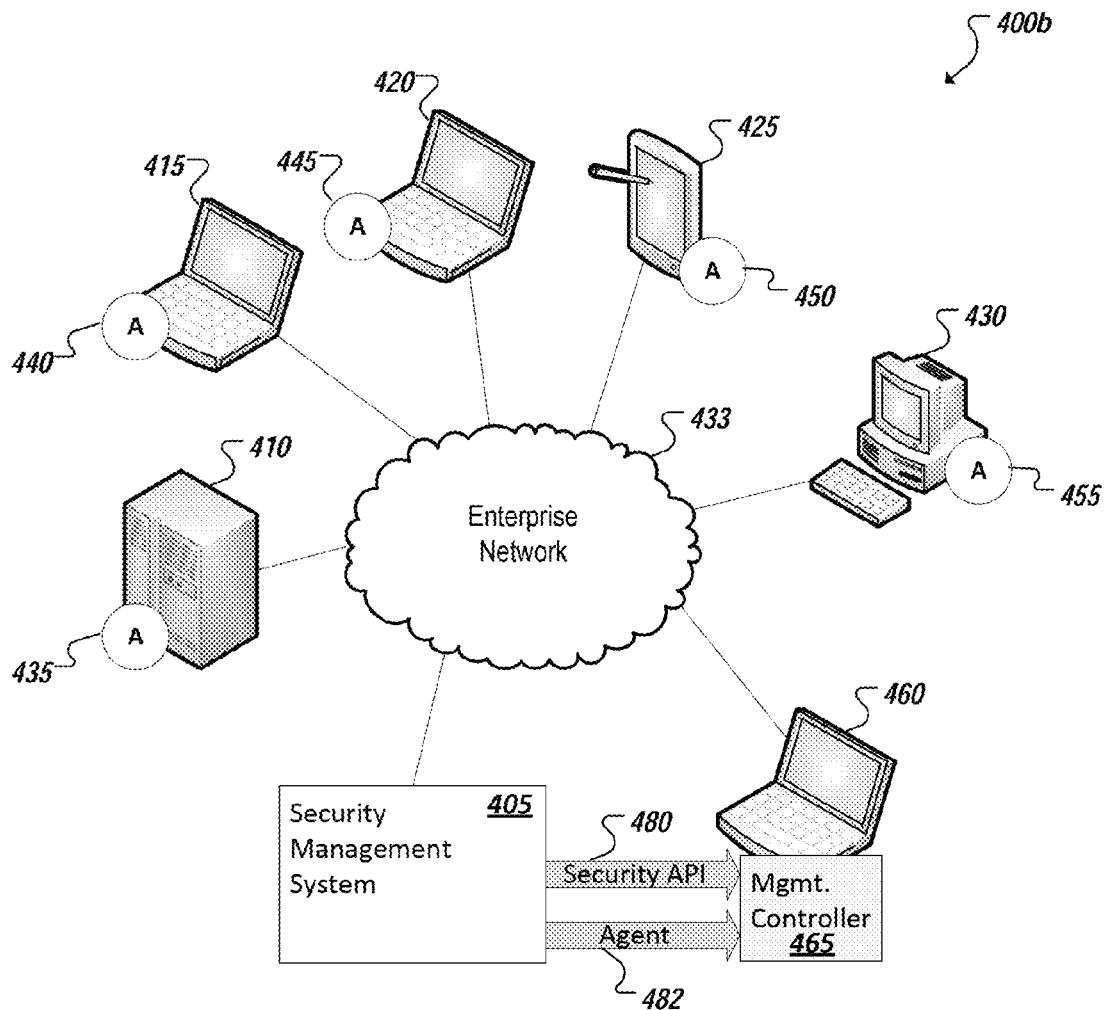

Turning to FIG. 4B, upon authenticating the unknown device 460, a security API can be provided 480 allowing for the management system to interface with the device 460 to perform one or more security-related tasks on the device, apply enterprise security and compliance policies on the device, among other tasks, based on the attributes identified for the device 460. In one example, illustrated in FIG. 4B, it can be discovered (e.g., through communication with the management controller 465 or pinging the device 460) that the device 460 is unmanaged in that it does not have an agent compatible with the management system 405 (and/or other security tools, scanners, etc. of the corresponding enterprise domain). Accordingly, the management system 405 can provision an agent 483 onto the device 460 through the management controller 465. In some implementations, the provisioned agent 483 can be a persistent agent that is present on the device 460 each time the device 460 enters the enterprise domain (at least until the agent is removed by the user or other facility of the device 460). In other examples, a dissolvable agent can be loaded onto the device 460 through the management controller 465, for use by the management system 405 during a current session with the device 460. At the conclusion of the session (or some other period of time), the agent can be automatically deactivated, deconstructed, and/or deleted.

Figure 4C:
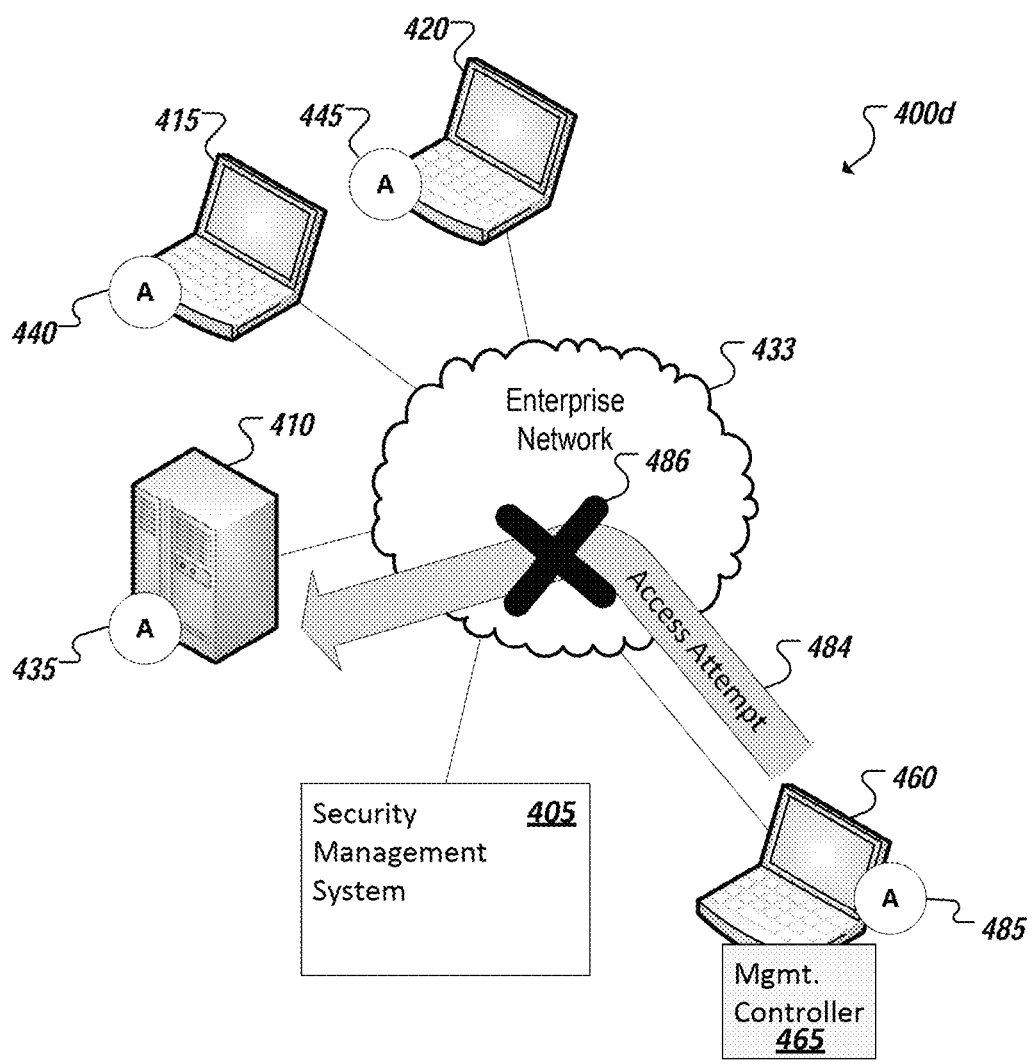

Turning now to FIG. 4C, having established communication with a management controller 465 and/or provisioned device 460 with an agent (e.g., 485), the management system 405 can enforce one or more security policies through the management controller 465. Additionally, based on the attributes of the device 460 as communicated to the management system 405 via the management controller 465, the management system 405 can determine which security policies of the enterprise are relevant to the device and additionally employ security tools, network elements, and other elements of the enterprise domain to enforce such policies. As an example, a data access policy can exist within the enterprise domain governing the access rights and use of data assets stored on one or more servers (e.g., 410) within the domain. In the example of FIG. 4C, from information obtained from the management controller 460 and/or agent 485, attributes of the device 460 can be identified that are relevant to this example data access policy. Accordingly, the management system 405 can enforce the policy (e.g., by way of routers, data access controls, etc. in the enterprise domain) on the device 460 in accordance with the reported device attributes. For example, the management system 405 can cause an access attempt 484 to be blocked 486 based on the policy, among many other potential examples.

Figure 4D:
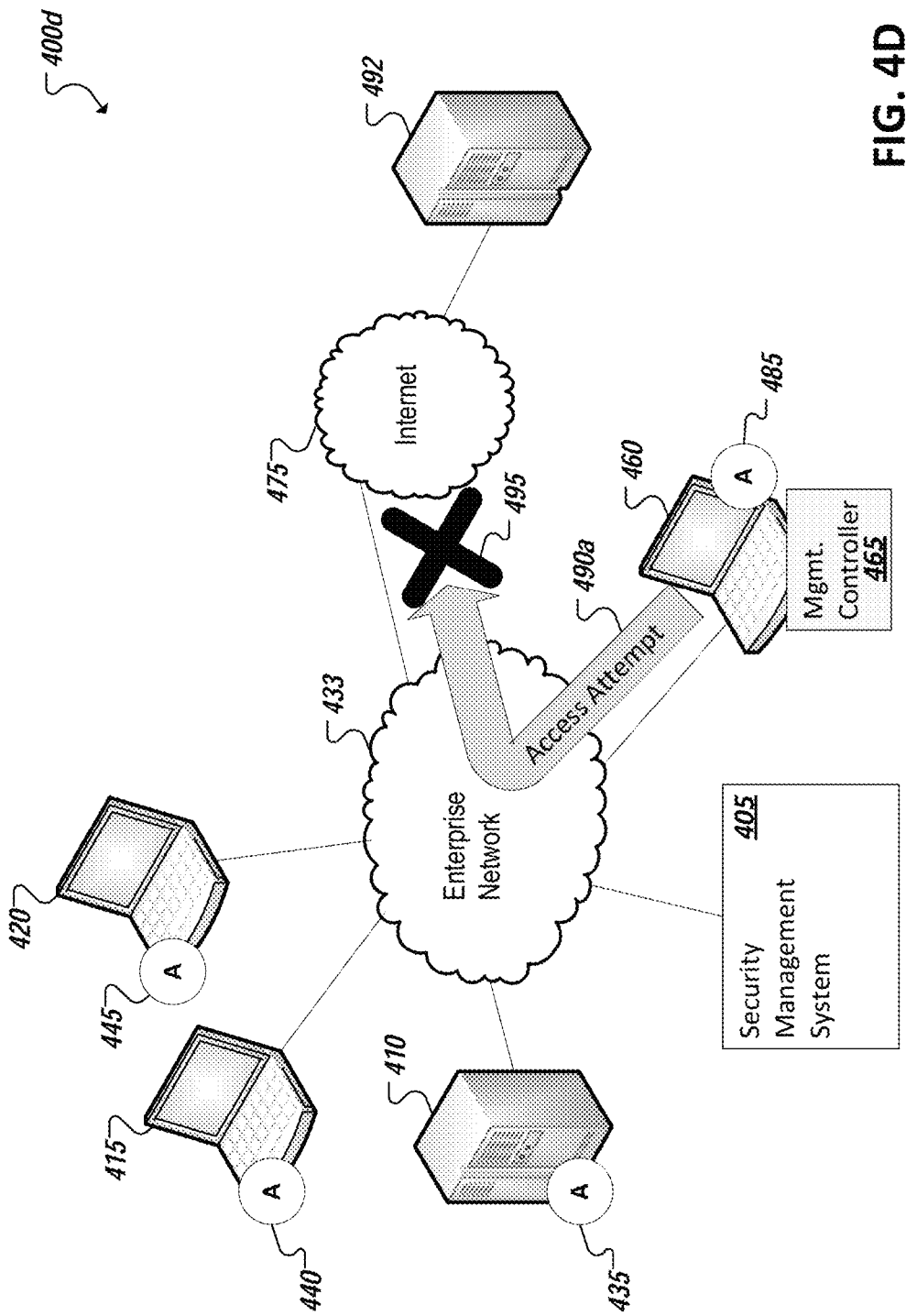

For instance, in another example, illustrated in FIG. 4D, in addition to enforcing policies involving a device's 460 direct interactions with assets of the enterprise domain (e.g., data assets of system asset 410), the management system 405 can additionally enforce policies defining the ability of assets to utilize networks 433 of the domain as well as access resources outside the domain over the network 433. For instance, an internet connection of the enterprise network 433 can be exploited by a system device to introduce threats and vulnerabilities to the enterprise domain from web-based sources. For instance, sensitive data can be leaked or otherwise communicated, sharing data private to the domain with sources (e.g., 492) outside the domain. Additionally, resources served by outside sources (e.g., 492) can also threaten a domain, such as viruses, worms, malware, spyware, and other exploits introduced to the domain.

Figure 4E:
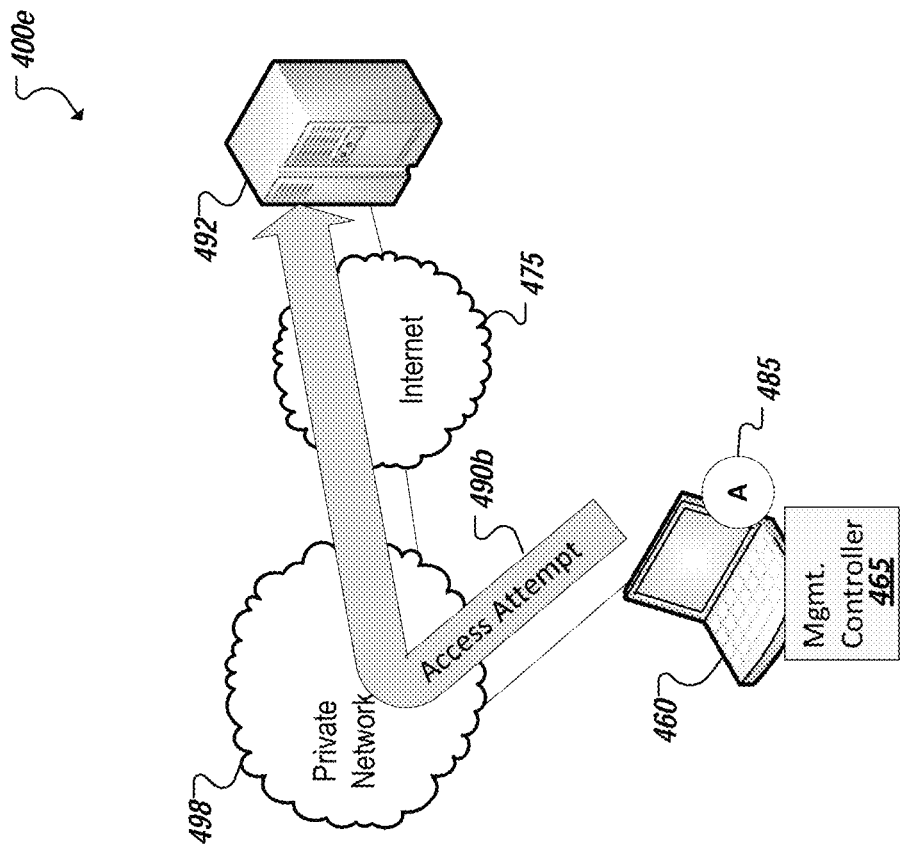
Figure 4E:
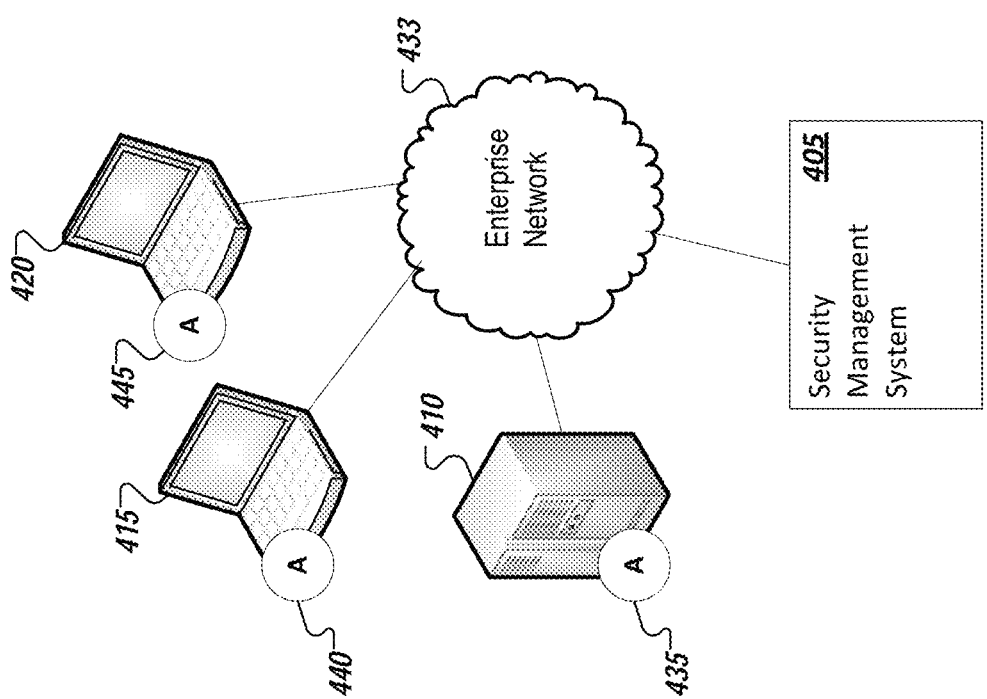

In the example of FIG. 4D, device 460 can attempt to access an online resource hosted by a particular server 492 over the internet 475 while connected to the enterprise network 433. As in the example of FIG. 4C, the management system can discover policies applicable to the device 460 from attribute information received from the device's management controller 465 and/or agent 485 and apply the policies to the device 460 using security tools, such as internet gateways, firewalls, and other tools. Additionally, in some implementations, the management system 405 can interface with the management controller 465 to enforce such policies on the device 460. In one example, a policy applying to attempts to access 490a the resource of server 492, using a device with attributes shared by device 460 can result in the attempt being blocked 495, at least while the device 460 is still on the enterprise network managed by management system 405. When the device 460 leaves the enterprise network, however, in some instances, the device 460 may be permitted to access 490b the resources of server 492, such as when the device 460 uses a private home network 498 to connect to the internet 475, as shown in the example of FIG. 4E. In alternative implementations, the management controller can allow for some of the policies of the enterprise domain to persist on the device 460 even after the device leaves the enterprise domain, among other examples.

Turning to the examples of FIGS. 5A-5E, simplified block diagrams 500a-e are shown illustrating additional example operations including an example management controller of a system device. Indeed, in the example of FIG. 5A, a private home network 510 can include a security management system 505 capable of communicating over the network 510 with one or more smart devices, including personal computing devices (e.g., 515, 530), smart televisions (e.g., 525), in-vehicle computing devices 520 (e.g., an in-vehicle infotainment (IVI) system), among potentially many other examples. Devices (e.g., 515, 520, 525, 530) in the home network 510 can include chipsets equipped hardware-based management controllers (e.g., 535, 540, 545, 550) capable of connected to and communicating with the management system 505.

Figure 5A:
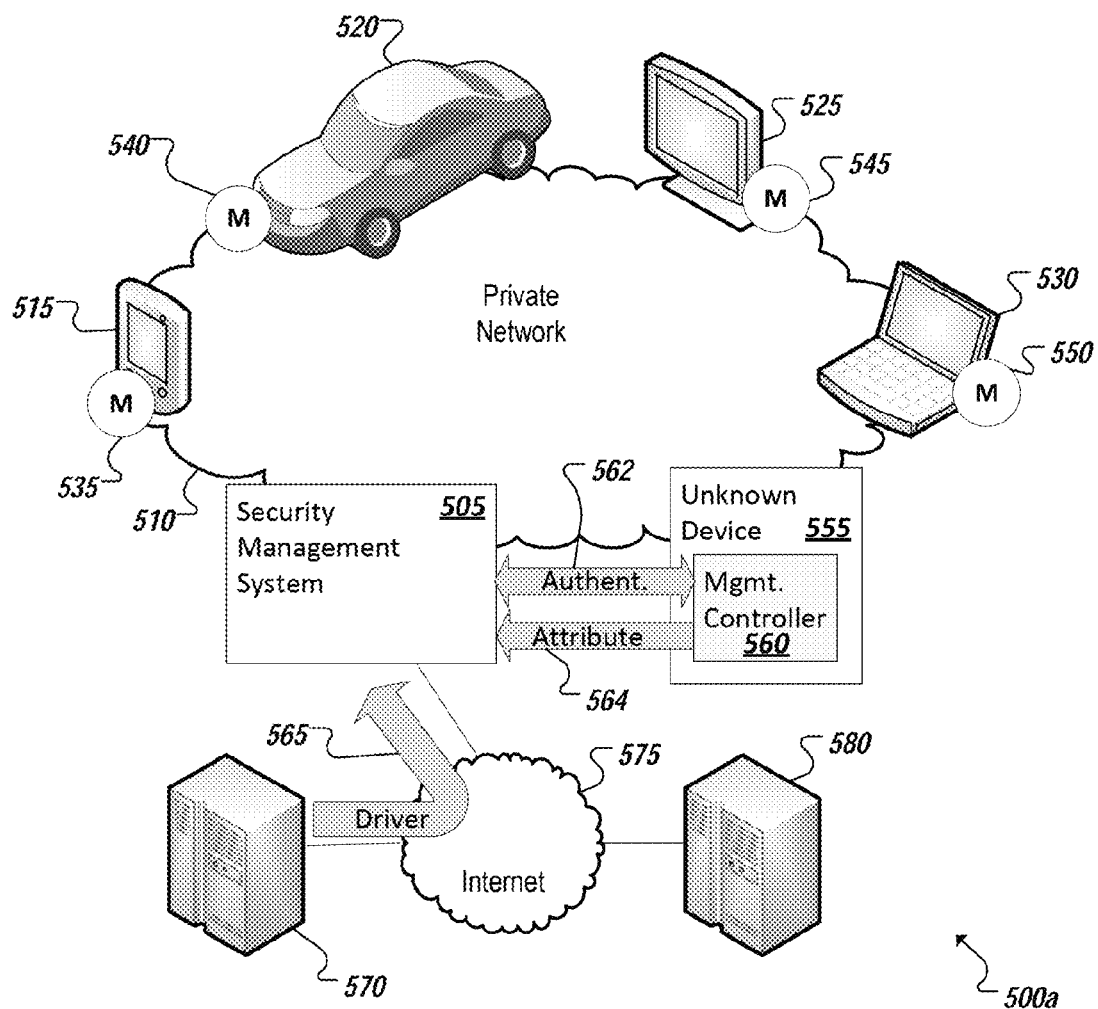
FIGS. 5A-5E are simplified block diagrams illustrating example operations of including an example device management system and one or more system devices having hardware-based management controllers in accordance with at least one embodiment.

In one example, illustrated in FIG. 5A, an unknown device 555 can attempt to interface with the private network and be identified by the management system 505. The management system 505 can attempt to identify whether the device 555 includes a management controller 560 or other facilities allowing coordination between the management system 505 and the device 555. In this particular example, the management system 505 requests a secure, hardware-based connection with the device through a management controller 560. The management system 505 and management controller 560 can establish a secure communication channel and mutually authenticate 562. In the case of the management controller 560, a hardware-based secure identifier of the management controller can be shared with the management system 505 to authenticate the device 555 and management controller 560 at the management system 505. Further, the management controller 555 can supply trustworthy attribute data 564 to the management system 505 identifying at least some attributes of the system device 555 to assist the management system 505 in understanding what type of device 555 has entered the network 510. Attribute data 564 can also include a unique secure identifier of the system device 555 and the management system 505 can identify, from the secure identifier, that the system device is a known device and can further associate previously generated or obtained profile data with the system device based on the transmission of the trustworthy secure identifier of the system device 555.

In one example, shown in FIG. 5A, the management system 505 can identify information from the attribute data 564 (or profile data maintained for the device 555), such as a model number, manufacturer name, or other information, and identify one or more sources, including remote source servers (e.g., 570, 580) of additional information relating to the device 555. In one example, the management system 505 can determine that it lacks a device driver for the device 555 and identify, for instance, through a search or other query of internet resources, a source 570 of a driver for the device 555 based on the attributes of the device 555. Accordingly, the management system 505 can communicate with the source 570 of the driver (e.g., over the Internet 575), to obtain the driver 565 for the device 555. The driver 565 can then be used by the management system 505 to better communicate with the device 555 as well as facilitate, translate, and enable communications between different devices on the private network 545 that would otherwise be unable to communicate and cooperatively operate with the other.

Figure 5B:
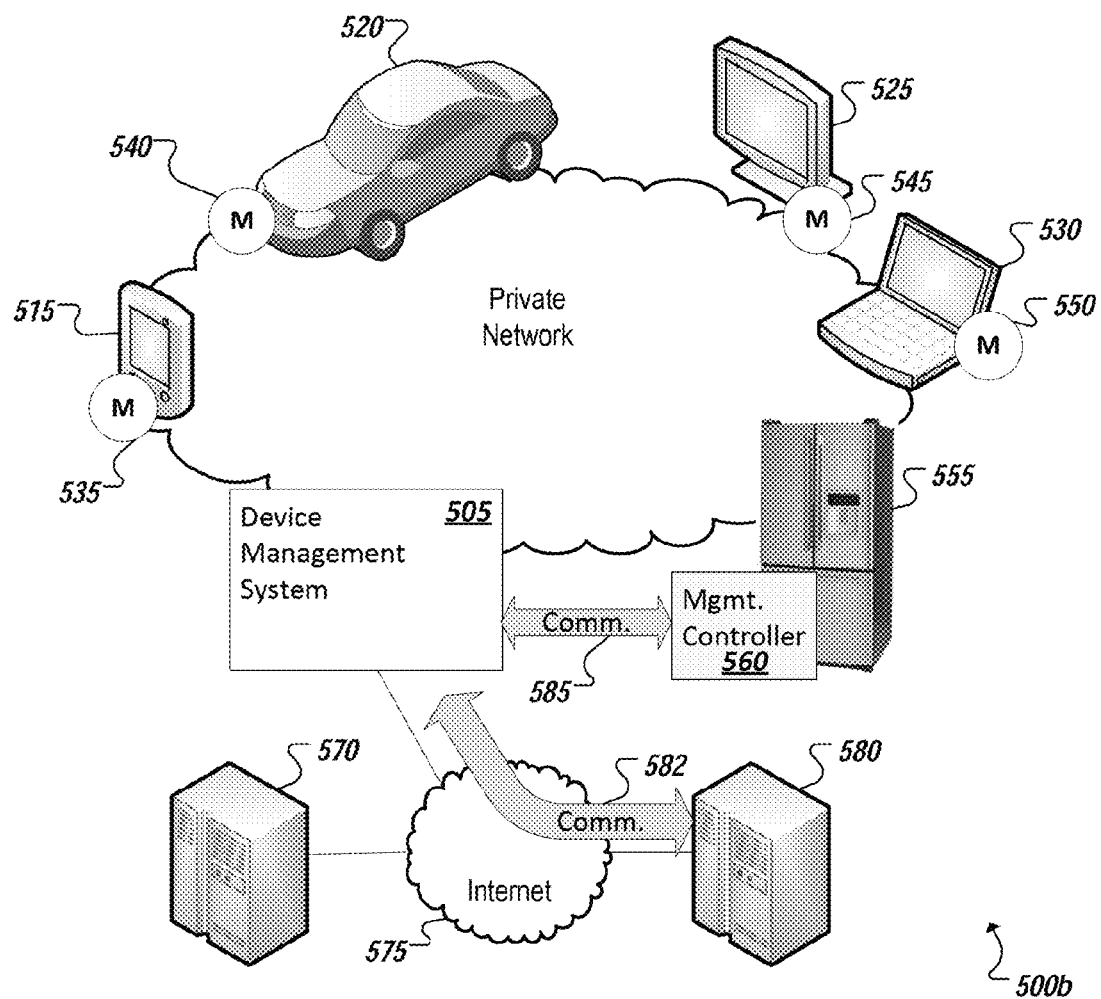

In addition to drivers, the management system 505 can also identify sources of other information relating to the device 555 based on attributes of the device 555 and communicate with the source (e.g., 580) to obtain additional information for the device 555. The management system 505 can use this information to supplement other information obtained for the device 555, such as the information obtained in attribute data 564 or profile data maintained by the management system 505 for the device 555. In the example of FIG. 5B, the management system 505 can identify the previously unknown device 555 as a smart appliance, such as a refrigerator, located within range of the home network 510 and possessing a computing module that includes a management controller 560. In one particular example, the management system 505 can obtain a driver for use in communicating a certain set of instructions to the smart appliance 555. Additionally, the management system 505 can identify a server (e.g., 580) associated with a manufacturer, retailer, etc. of the smart appliance 555. The management system 505 can communicate 582 with the source 580 to obtain additional information concerning the smart appliance 555 model, such as security features, warranty information, maintenance information, error codes, and additional specification and configuration information of the appliance 555 from the identified source 580. The management system 505 can further apply this information in its interactions with the appliance 555.

Further, the management system 505 can, in some instances, also perform or assist in transactions using information gleaned from the outside source 580. For instance, a management system 505 can assist in a maintenance ticket, warranty audit or claim, product recall, software or hardware update, etc. by communicating attribute information collected or otherwise known to the management controller 560 of the appliance 555 and shared (e.g., 585) with the management system 505. Additionally, the management system 505 can also communicate (e.g., 585) information obtained from the source 580 with the appliance 555, such as information usable by the appliance in improving its functionality. Through the coordination of a source 580, management system 505, and management controller 560, the management system 505 can utilize a secure and trusted connection with the management controller 560 to assist in providing services and performing tasks involving the appliance 555, including, but not limited to, remote diagnostics, performance monitoring (e.g., identifying users' tendencies using the device, energy performance of the device, typical load placed on the device, etc.), remote maintenance, and other features. Indeed, still other services can be imagined and enabled utilizing data from third parties, such as, in the example of a smart refrigerator, an online shopping service, refrigerator maintenance provider, or other service that can utilize information obtainable from the device (e.g., 555) or deliverable to the device through a management controller (e.g., 560) in connection with a secure session with a management system 505, among other examples.

Figure 5C:
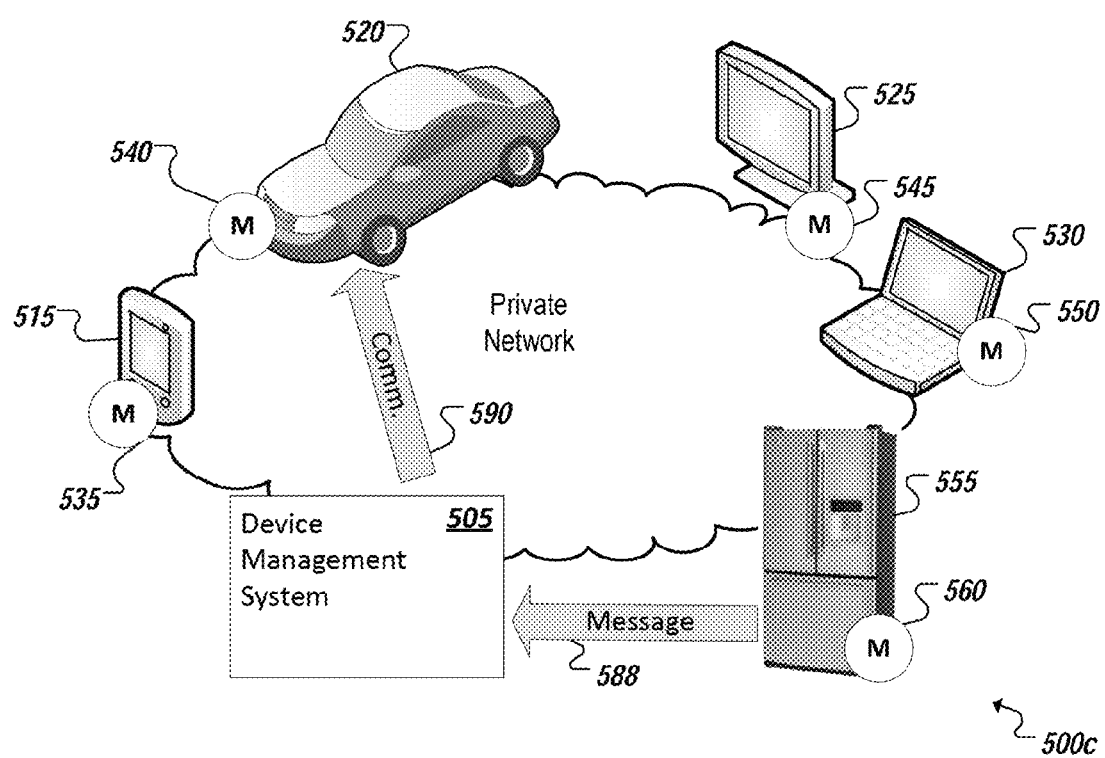
Figure 5D:
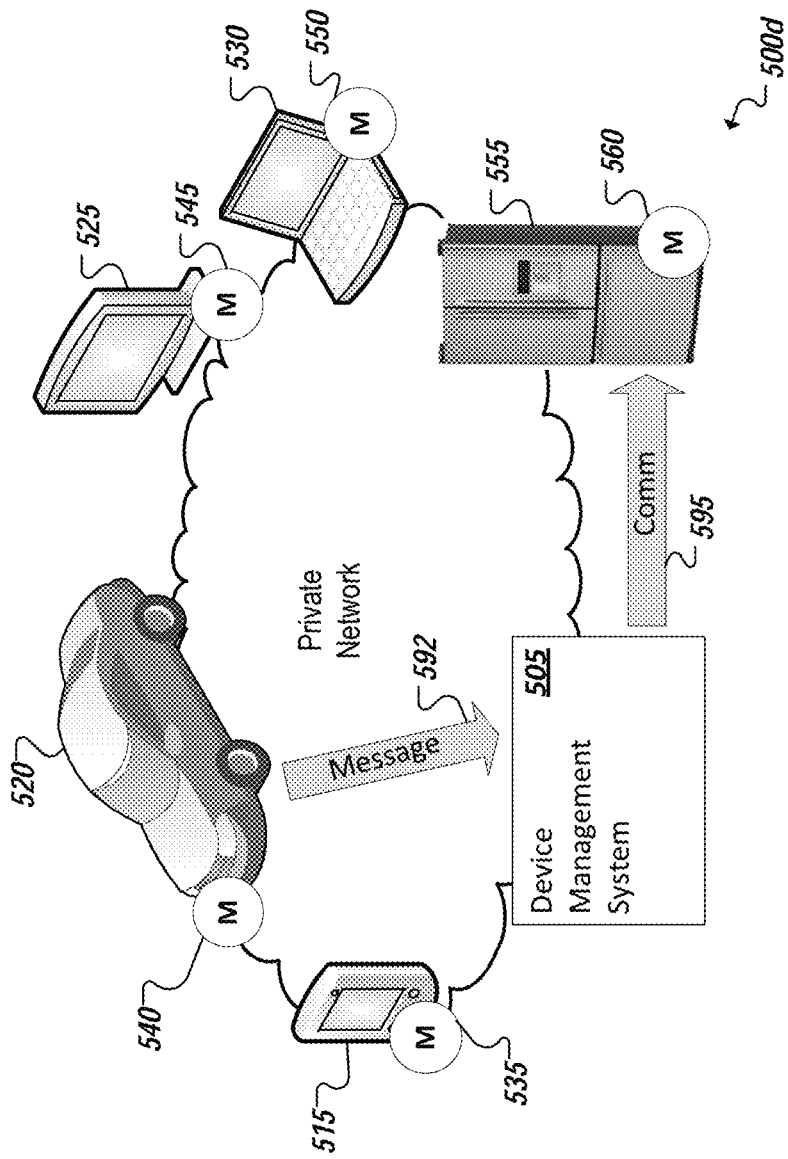

Turning now to FIGS. 5C and 5D, a management system 505 can additionally serve as a facilitator or enabler of communication and interoperation of two or more system devices in a domain, including devices otherwise not designed, enabled, or configurable for intercommunication and interoperation. As an example, as shown in the FIG. 5C, a set of commands and capabilities of a particular system device (e.g., an in-vehicle computing system 520) can be identified by a management system 505 based on information received from the device's 520 management controller 540 as well as other sources (e.g., sources 570, 580), including a driver obtained for the device by the management system 505. Similarly, the management system 505 can also obtain attribute information of other devices in the domain 510, such as the commands, operations, features, functionality, etc. of a smart appliance 555.

In but one illustrative example, an example management system 505 can coordinate operation of the in-vehicle computer 520 and the smart appliance 555 (or potentially between any combination of two or more different devices 515, 520, 525, 530, 555 in the domain 510 having management controllers 535, 540, 545, 550, 560). For instance, an interoperation can be identified or defined. For instance, a pre-defined interoperation can be identified, for instance, in memory of the management system 505 or an outside server cataloguing potential interoperations and relationships between various device combinations. In other instances, a user can define an interoperation between two devices (e.g., using an interface presenting identified capabilities and functions of the two or more devices and allowing the user to define a dependency between the respective operations, among other examples). As an illustrative example, an interoperation can be defined that triggers an alert at the in-vehicle computer when a lack of capacity is determined in the smart refrigerator using, for instance, the management controller 560 (e.g., data obtained from a scale or other functionality included in the refrigerator identifying when a particular refrigerator compartment (e.g., a milk holder, butter holder, etc.) is running low or empty). A management controller 560, in a secure session with the management system 505, can communicate that a low capacity condition has been identified in the refrigerator 555 through a hardware-based API between the management controller 560 and management system 505. By itself, the refrigerator 555 may lack the capability to communicate such a condition to other devices, much less the particular in-vehicle computer 520. However, in this example, the management system 505, in another secure session between the management system 505 and in-vehicle computer 520, can translate (e.g., based on a driver of the in-vehicle computer 520) the message 588 received by the management controller 560 of the refrigerator 555 into a command that comports with the communication capabilities, protocols, available routines, and available functions of the in-vehicle computer 520. For instance, the management system 505 can send a translated message 590 to the in-vehicle computer 520. The message 590 can be interpretable by the in-vehicle computer 520 to cause the in-vehicle computer 520 to render an alert or instruction, for instance, on a display of the in-vehicle computer 520. For example, the display can indicate to a user the condition of the refrigerator to the user as the user starts up the car, assisting the user in understanding that a trip to the grocery store might be desirable to address the findings at the smart refrigerator 555.

Turning to FIG. 5D, communication between different and otherwise incompatible (or less compatible) devices in a domain (e.g., 510) can be uni- or bi-directional, in that devices can communicate back and forth utilizing the management system 505 as an interpreter and coordinator for the interoperation. For instance, in FIG. 5D, an in-vehicle computer 520 can send a message 592 to the management system 505 in connection with an interoperation involving the in-vehicle computer 520 and refrigerator 555 handled by the management system 505. The management system 505 can identify a corresponding message type for the interoperation and generate a message 595 of this type (e.g., based on a driver obtained for the refrigerator computer 555) based on the content of the message 592 received from another device in the interoperation. The refrigerator 555 can then receive the message 595 and process the message to perform a function or task performable by the refrigerator 555. As but one of potentially countless examples, a query message (e.g., 592) can be sent from the in-vehicle computer 520 requesting information relating to attributes of the refrigerator (e.g., refrigerator capacity, water filter status, light bulb status, etc.), for instance, in response to a request from a user at the in-vehicle computer 520 relating to a user's shopping trip using the vehicle. The example query 592 can be translated into a format and routine compatible with the refrigerator 555, which the refrigerator computer can process and respond to (e.g., according to principles of the example of FIG. 5E).

It should be appreciated, particularly as the selection of computer-enhanced devices and appliances expand, that a potentially limitless combination of interoperations can be enabled between two or more devices within a domain through management controllers of the devices and a management system (e.g., 505) of the domain. Further, while various combinations of devices have been referenced in some of the above examples, it should be appreciated that these are but non-limiting examples presented merely for the sake of illustrating certain principles and that any device having a compatible management controller (e.g., 535, 540, 545, 550, 560) can be potentially utilized in interoperations with another device managed through a management system 505 of a domain. Additionally, while some interactions between a management system 505 and hardware-based management controllers (e.g., 535, 540, 545, 550, 560) can take place over a local area network, such as a private home WiFi network, in other instances, a tunnel or other secure channel can be established between a management system 505 and a management controller over one or more other networks, including cellular broadband data networks, and other networks, such as wide-area networks, further enhancing the array of interoperations that can be defined and enabled between devices.

Other interoperations can include the enhancement of existing interoperations between devices. For instance, hardware-based sessions between management controllers (e.g., 535, 540, 545, 550, 560) and the management system 505 can be utilized to supplement or replace other functionality of the devices that already allow (at least a portion of) such interoperation. Through the utilization of a central management system 505 and secure, hardware-based communications, authentication, and data gathering, the security of existing or alternative inter-device operations can be enhanced. Further, the management system 505 can serve as a gateway for inter-device communications and operations, assisting in protecting against vulnerabilities, threats, and other security issues being introduced through a web of different inter-device communication channels, types, networks, etc. used in the various different inter-device operations, among other advantages.

Figure 5E:
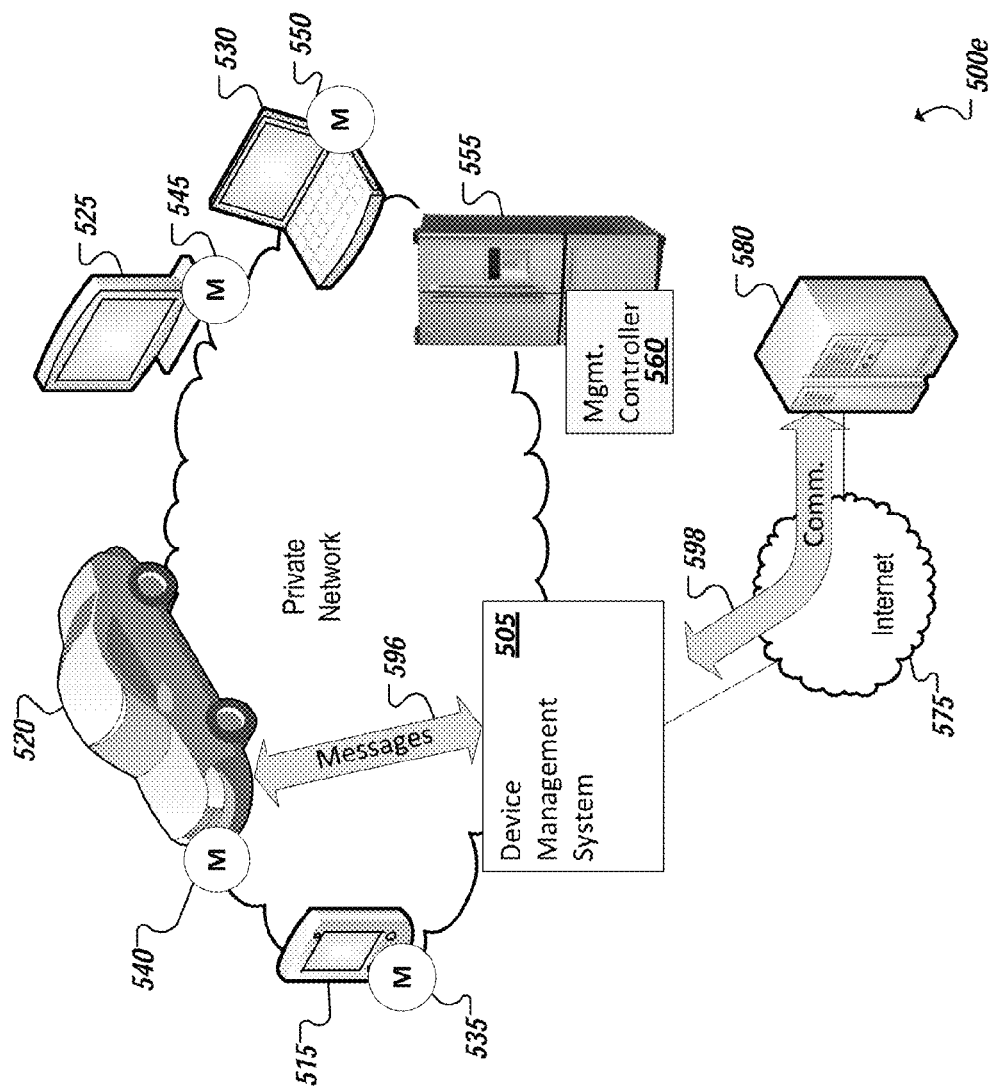

Turning to FIG. 5E, in addition to facilitating interoperation between devices (e.g., 515, 520, 525, 530, 555) within a domain 510 managed by the management system 505, the management system 505 can, in some implementations, also facilitate transactions between a system device having a management controller and devices and systems outside the domain. For instance, the management system 505 can serve as a gateway or proxy for communications with devices and systems outside the domain, including web-based systems (e.g., 580). For example, as shown in FIG. 5E, rather than communicating directly over a broadband, WiFi, or other internet connection, a system device (e.g., 520) can communicate with a web server 580 via the management system 505. The management system 505, for instance, can receive messages 596 from the system device 520 and interpret the messages, for instance, according to information obtained from the system device management controller 540, or another source (such as a source of a driver for the device 520). The management system 505, in some examples, may translate the messages 596 originating from the device (e.g., 520) into a format and protocol compatible with communications with the web server 580 over the Internet 575 (e.g., according to protocols of the Internet Protocol suite, etc.). In other instances, the management system 505 can receive messages already at least partially formatted for delivery over the Internet 575 to the web server 580. However, the management system 505 can provide domain security, through firewall, intrusion prevention, malware detection, gateway security, and other services to packets constructed from or originating as messages received over secure sessions with management controllers (e.g., 540) of the devices (e.g., 520). Indeed, the management system 505 can serve as a proxy for communications with any device in the domain, thereby insulating and providing additional security for the devices. Accordingly, the management system 505 can also receive messages 598 from an outside web server 580, process the messages 598 (e.g., perform security scans, etc.), and, in some cases, translate the messages 598 to comply with the functionality, protocols, and routines of the system device (e.g., as determined from attribute data from the system device). Such processed messages can then be forwarded 596 to the system device (e.g., 520) within the domain, among other examples.

FIGS. 6A-6B are simplified flowcharts 600*a-b* illustrating example techniques involving a hardware-based management controller of a system device and, in some cases also, a management system of a domain with which the system device interacts. For instance, in the example of FIG. 6A, a hardware-based management controller of a device can be identified 605 within a domain. The identification of a management controller can be limited to those management controller compatible or authorized for communication with a particular management system of a domain. The management controller can be queried for attribute data of the device. Such attribute data can include authentication data sent from the management controller, for instance, a secure identifier generated from hardware-based identifiers of the device. Attribute data can further describe attributes of the device including hardware, software, geolocational, status, and other attribute types. A security policy can be identified that is germane to the attribute data received 615 from the management controller (e.g., over a secure channel established between the domain and the management controller). The security policy can then be applied 620 to interactions and transactions between the management controller and a given domain. Such security policies can be applied 620, for instance, utilizing one or more security tools deployed on the device or within the domain.

Turning to the example of FIG. 6B, a hardware-based management controller of a device can be identified 625 and the management controller can be queried 630 for attribute data describing attributes of the device. Attribute data can be received 635 in response to the query and can be used to identify 640 a device driver of the device. In some instances, identifying 640 the device driver can include identifying the device driver in memory of a management system of the domain, while in other instances, the device driver can be identified as being hosted by a remote source, prompting acquisition of the driver from the remote source. The device driver can then be used to communicate 645 with the device. The device can be communicated 645 with through the device driver and/or the management controller. Further, the driver can be leveraged to define (or identify pre-defined) interoperations that can be facilitated between the device and at least one other device. Such interoperations can include interoperations between devices that are otherwise incompatible. For instance, a management system can translate messages received from a first device according to a device driver of a second device, to generate a message for the second device that is actionable by the second device and responsive to the message received from the (potentially, otherwise incompatible) first device, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In general, subject matter of the present disclosure includes methods, software, computer executable instructions, and systems capable of performing such tasks as identifying a first management controller of a first computing device on a network, querying the first management controller for attributes of the first computing device, and receiving, from the first management controller, data identifying one or more attributes of the first computing device. The first management controller can be implemented in hardware of the first computing device and can be independent of a central processing unit (CPU) of the first computing device. A security policy of the network can be implemented for the first computing device based on the one or more attributes.

In one example, a system can be implemented to include at least one processor device, at least one memory element, and a management system adapted when executed by the at least one processor device to identify the first management controller of the first computing device on a network, query the first management controller for attributes of the first computing device, and implement a security policy of the network on the first computing device based on the one or more attributes received from the first management controller.

In some instances, implementing the security policy can cause access to at least some resources of a domain by the first computing device to be limited according to the security policy. The security policy can be a policy of an enterprise computing system. A first device driver can be identified for the first computing device, the security policy implemented through communication with the first computing device using the first device driver. In some examples, attributes of the first computing device can include such examples as a model identifier, a manufacturer of the first computing device, hardware attributes of the first computing device, and/or software attributes of the first computing device.

In some instances, an agent can be caused to be installed on the first computing device. For example, the agent can be installed through the first management controller. The agent can be installed on an operating system of the first computing device. The security policy can be implemented using the installed agent and data describing additional attributes of the first computing device can be obtained using the agent. In some cases, the agent can be a dissolvable agent. In some cases, communication with the first management controller can reveal whether an agent is installed on the first computing device.

In some instances, a first device driver can be identified for the first computing device. The security policy can be implemented through communication with the first computing device using the first device driver. One or more capabilities of the first computing device can be discovered based on the first device driver. Further, the first computing device can be authenticated based on an identifier derived from secure data embedded in hardware of the first computing device. The identifier can be unique to a pairing of the first computing device and a particular domain. The secure data can be stored in secure memory of the first management controller. Additionally, authentication data can be sent to the first management controller to mutually authenticate at the first management controller.

In some instances, in addition to communications with a first management controller of a first computing device, a second management controller of a second computing device can be identified on the network, the second management controller implemented in hardware of the second computing device and independent of a CPU of the second computing device. The second management controller can be queried for attributes of the second computing device and receive, from the second management controller, data identifying one or more attributes of the second computing device. Additionally, another security policy of the network can be implemented on the second computing device based on the one or more attributes of the second computing device. The attributes of the first computing device may be different from the attributes of the second computing device and the security policy applied to the first computing device can be different from the security policy applied to the second computing device. For instance, the first computing device may be of different type than the second computing device, among potentially many other examples as well as combinations of the foregoing.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
    identify a first management controller of a first computing device on a network, wherein the first management controller is to be implemented in hardware of the first computing device and is outside control of a central processing unit (CPU) of the first computing device;
    query the first management controller for attributes of the first computing device;
    receive, from the first management controller, data identifying one or more attributes of the first computing device; and
    implement a security policy of the network on the first computing device based on the one or more attributes.

2. The storage medium of claim 1, wherein implementing the security policy causes access to at least some resources of a domain by the first computing device to be limited according to the security policy.

3. The storage medium of claim 1, wherein the security policy is a policy of an enterprise computing system.

4. The storage medium of claim 1, further comprising identifying a first device driver for the first computing device, wherein the security policy is implemented through communication with the first computing device using the first device driver.

5. The storage medium of claim 1, further comprising causing an agent to be installed on the first computing device.

6. The storage medium of claim 5, wherein the agent is installed through the first management controller.

7. The storage medium of claim 5, wherein the agent is dissolvable.

8. The storage medium of claim 5, wherein the agent is installed on an operating system of the first computing device.

9. The storage medium of claim 5, wherein the security policy is implemented using the installed agent.

10. The storage medium of claim 5, further comprising obtaining data describing additional attributes of the first computing device using the installed agent.

11. The storage medium of claim 5, further comprising determining whether an agent is installed on the first computing device.

12. The storage medium of claim 1, wherein the attributes include a model identifier of the first computing device.

13. The storage medium of claim 1, wherein the attributes include a manufacturer of the first computing device.

14. The storage medium of claim 1, wherein the attributes include hardware attributes of the first computing device.

15. The storage medium of claim 1, wherein the attributes include software attributes of the first computing device.

16. A method comprising:
    identifying a first management controller of a first computing device on a network, wherein the first management controller is implemented in hardware of the first computing device and is outside control of a CPU of the first computing device;
    querying the first management controller for attributes of the first computing device;
    receiving, from the first management controller, data identifying one or more attributes of the first computing device; and
    implementing a security policy of the network on the first computing device based on the one or more attributes.

17. The method of claim 16, further comprising identifying a first device driver for the first computing device, wherein the security policy is implemented through communication with the first computing device using the first device driver.

18. The method of claim 17, further comprising identifying one or more capabilities of the first computing device based on the first device driver.

19. The method of claim 16, further comprising authenticating the first computing device based on an identifier derived from secure data embedded in hardware of the first computing device.

20. The method of claim 19, wherein the secure data is stored in secure memory of the first management controller.

21. The method of claim 19, further comprising sending authentication data to the first management controller to mutually authenticate at the first management controller.

22. The method of claim 19, wherein the identifier is unique to a pairing of the first computing device and a particular domain.

23. The method of claim 16, further comprising:
    identifying a second management controller of a second computing device on the network, the second management controller implemented in hardware of the second computing device and independent of a CPU of the second computing device;
    querying the second management controller for attributes of the second computing device;
    receiving, from the second management controller, data identifying one or more attributes of the second computing device; and
    implementing another security policy of the network on the second computing device based on the one or more attributes of the second computing device.

24. The method of claim 23, wherein the attributes of the first computing device are different from the attributes of the second computing device and the security policy applied to the first computing device is different from the security policy applied to the second computing device.

25. The method of claim 23, wherein the first computing device is of a type different from the second computing device.

26. The method of claim 16, wherein the attributes include one or more of a model, manufacture, software functionality, and hardware functionality of the first computing device.

27. A system comprising:
    at least one processor device;
    at least one memory element; and
    a management system adapted when executed by the at least one processor device to:
        identify a first management controller of a first computing device on a network, wherein the first management controller is to be implemented in hardware of the first computing device and is outside control of a CPU of the first computing device;
        query the first management controller for attributes of the first computing device;
        receive, from the first management controller, data identifying one or more attributes of the first computing device; and
        implement a security policy of the network on the first computing device based on the one or more attributes.

* * * * *